(12) United States Patent
Hettrich et al.

(10) Patent No.: US 11,884,183 B2
(45) Date of Patent: Jan. 30, 2024

(54) THERMAL MANAGEMENT SYSTEM FOR VEHICLES WITH AN ELECTRIC POWERTRAIN

(71) Applicant: QuantumScape Battery, Inc., San Jose, CA (US)

(72) Inventors: Kevin Hettrich, Mountain View, CA (US); Tomasz Wojcik, Sunnyvale, CA (US); Weston Arthur Hermann, Palo Alto, CA (US)

(73) Assignee: QUANTUMSCAPE BATTERY, INC., San Jose, CA (US)

( * ) Notice: Subject to any disclaimer, the term of this patent is extended or adjusted under 35 U.S.C. 154(b) by 0 days.

(21) Appl. No.: 18/154,338

(22) Filed: Jan. 13, 2023

(65) Prior Publication Data

US 2023/0256866 A1     Aug. 17, 2023

Related U.S. Application Data

(60) Continuation of application No. 17/115,713, filed on Dec. 8, 2020, now Pat. No. 11,577,626, which is a
(Continued)

(51) Int. Cl.
*B60L 58/27* (2019.01)
*B60L 58/24* (2019.01)
(Continued)

(52) U.S. Cl.
CPC .......... *B60L 58/27* (2019.02); *B60H 1/00278* (2013.01); *B60H 1/00392* (2013.01);
(Continued)

(58) Field of Classification Search
CPC ......... F01P 2050/24; B60L 3/00; B60L 58/27; B60L 58/24; B60L 1/00278;
(Continued)

(56) References Cited

U.S. PATENT DOCUMENTS 3,357,541 A    12/1967   Skinner
4,189,528 A    2/1980   Klootwyk
(Continued)

FOREIGN PATENT DOCUMENTS

CN      202507950 U    10/2012
DE      102009046567    5/2011
(Continued)

OTHER PUBLICATIONS

European Search Report for Application No. 14154567.3 dated Aug. 8, 2014; 9 pages.
(Continued)

*Primary Examiner* — Devon Russell
(74) *Attorney, Agent, or Firm* — Squire Patton Boggs (US) LLP

(57) ABSTRACT

This patent application is directed to thermal management systems of vehicles with an electric powertrain. More specifically, the battery system and one or more powertrain components and/or cabin climate control components of a vehicle share the same thermal circuit as the battery module through which heat can be exchanged between the battery module and one or more powertrain or climate control components as needed.

18 Claims, 24 Drawing Sheets

Related U.S. Application Data continuation of application No. 16/292,147, filed on Mar. 4, 2019, now Pat. No. 10,889,205, which is a division of application No. 15/028,358, filed as application No. PCT/US2015/010179 on Jan. 5, 2015, now abandoned.

(60) Provisional application No. 61/923,232, filed on Jan. 3, 2014.

(51) Int. Cl.
| | | |
|---|---|---|
| *B60H 1/00* | (2006.01) | |
| *B60K 6/40* | (2007.10) | |
| *B60K 11/02* | (2006.01) | |
| *B60H 1/14* | (2006.01) | |
| *B60K 1/00* | (2006.01) | |

(52) U.S. Cl.
CPC ............... *B60H 1/143* (2013.01); *B60K 6/40* (2013.01); *B60K 11/02* (2013.01); *B60L 58/24* (2019.02); *B60H 2001/00307* (2013.01); *B60K 2001/003* (2013.01); *B60K 2001/005* (2013.01); *B60K 2001/006* (2013.01); *B60L 2240/34* (2013.01); *B60L 2240/36* (2013.01); *B60L 2240/445* (2013.01); *B60L 2240/662* (2013.01); *B60Y 2306/07* (2013.01); *Y02T 10/70* (2013.01); *Y02T 10/72* (2013.01); *Y02T 90/16* (2013.01); *Y10S 903/951* (2013.01)

(58) Field of Classification Search
CPC ...... B60L 1/00392; B60L 1/143; B60L 1/003; B60L 1/08; B60K 6/40; B60K 11/02; B60K 11/003; B60K 2001/003; B60K 2001/005; B60K 2001/006; B60H 1/00278
See application file for complete search history.

(56) References Cited

U.S. PATENT DOCUMENTS

| | | | |
|---|---|---|---|
| 5,369,351 A | 11/1994 | Adams | |
| 5,482,790 A | 1/1996 | Yamada et al. | |
| 5,618,641 A | 4/1997 | Arias | |
| 6,271,648 B1 | 8/2001 | Miller | |
| 6,357,541 B1* | 3/2002 | Matsuda | B60K 11/02 |
| | | | 903/905 |
| 6,624,615 B1* | 9/2003 | Park | B60L 53/11 |
| | | | 320/150 |
| 6,641,942 B1 | 11/2003 | Rouillard et al. | |
| 6,942,944 B2 | 9/2005 | Al-Hallaj et al. | |
| 7,148,637 B2 | 12/2006 | Shu et al. | |
| 7,154,068 B2 | 12/2006 | Zhu et al. | |
| 7,761,198 B2 | 7/2010 | Bhardwaj | |
| 7,933,695 B2 | 4/2011 | Yamaguchi | |
| 7,936,150 B2 | 5/2011 | Milios | |
| 8,190,320 B2 | 5/2012 | Kelty et al. | |
| 8,343,642 B2 | 1/2013 | Culver et al. | |
| 8,471,521 B2 | 6/2013 | Stewart et al. | |
| 8,543,270 B2 | 9/2013 | Kelty et al. | |
| 9,106,077 B2 | 8/2015 | Nakahara et al. | |
| 9,321,340 B2 | 4/2016 | Maskew et al. | |
| 9,362,546 B1 | 6/2016 | Donnelly et al. | |
| 9,393,921 B1 | 7/2016 | Weicker et al. | |
| 9,553,346 B2 | 1/2017 | Hermann | |
| 9,834,114 B2 | 12/2017 | Hettrich et al. | |
| 9,960,458 B2 | 5/2018 | Weicker et al. | |
| 10,369,899 B2 | 8/2019 | Hettrich et al. | |
| 10,889,205 B2 | 1/2021 | Hettrich et al. | |
| 11,011,783 B2 | 5/2021 | Hermann et al. | |
| 11,040,635 B2 | 6/2021 | Hettrich et al. | |
| 2001/0040061 A1* | 11/2001 | Matuda | B60W 10/30 |
| | | | 165/41 |
| 2002/0022178 A1 | 2/2002 | Asaka et al. | |
| 2003/0008205 A1 | 1/2003 | Horie et al. | |
| 2003/0184307 A1 | 10/2003 | Kozlowski et al. | |
| 2003/0186116 A1 | 10/2003 | Tanjou | |
| 2004/0180263 A1 | 9/2004 | Kase et al. | |
| 2005/0084754 A1 | 4/2005 | Klein | |
| 2005/0248313 A1 | 11/2005 | Thorland | |
| 2006/0240318 A1 | 10/2006 | Kim et al. | |
| 2007/0087266 A1 | 4/2007 | Bourke et al. | |
| 2007/0166574 A1 | 7/2007 | Nakashima et al. | |
| 2008/0213652 A1 | 9/2008 | Scheucher | |
| 2008/0299451 A1 | 12/2008 | Funahashi et al. | |
| 2009/0123820 A1 | 5/2009 | Han | |
| 2009/0239130 A1 | 9/2009 | Culver et al. | |
| 2009/0243538 A1 | 10/2009 | Kelty et al. | |
| 2009/0325043 A1 | 12/2009 | Yoon et al. | |
| 2010/0082227 A1 | 4/2010 | Posner et al. | |
| 2010/0089547 A1 | 4/2010 | King et al. | |
| 2010/0140246 A1 | 6/2010 | Grider et al. | |
| 2010/0217485 A1 | 8/2010 | Ichishi | |
| 2010/0258063 A1 | 10/2010 | Thompson | |
| 2010/0273042 A1 | 10/2010 | Buck et al. | |
| 2010/0273044 A1 | 10/2010 | Culver et al. | |
| 2010/0297483 A1 | 11/2010 | Kawai | |
| 2011/0076521 A1 | 3/2011 | Shimizu et al. | |
| 2011/0153140 A1 | 6/2011 | Datta et al. | |
| 2011/0159351 A1 | 6/2011 | Culver et al. | |
| 2011/0177383 A1 | 7/2011 | Culver et al. | |
| 2011/0267007 A1 | 11/2011 | Chen et al. | |
| 2012/0014889 A1 | 1/2012 | Miller et al. | |
| 2012/0046815 A1 | 2/2012 | Hermann et al. | |
| 2012/0058377 A1* | 3/2012 | Sastry | H01M 4/131 |
| | | | 429/94 |
| 2012/0126753 A1 | 5/2012 | Carkner et al. | |
| 2012/0148889 A1 | 6/2012 | Fuhr et al. | |
| 2012/0158228 A1 | 6/2012 | Biondo et al. | |
| 2012/0295142 A1 | 11/2012 | Yan et al. | |
| 2012/0316712 A1 | 12/2012 | Simonini et al. | |
| 2012/0328908 A1 | 12/2012 | Han et al. | |
| 2013/0004804 A1 | 1/2013 | Robertson et al. | |
| 2013/0022848 A1 | 1/2013 | Schroeter et al. | |
| 2013/0059172 A1 | 3/2013 | Sastry et al. | |
| 2013/0084505 A1* | 4/2013 | Iriyama | H01M 10/052 |
| | | | 429/322 |
| 2013/0101878 A1 | 4/2013 | Pilgram et al. | |
| 2013/0103240 A1 | 4/2013 | Sato et al. | |
| 2013/0126794 A1* | 5/2013 | Lee | C22C 13/00 |
| | | | 264/105 |
| 2013/0202929 A1 | 8/2013 | Kako et al. | |
| 2013/0218447 A1 | 8/2013 | Mayinger | |
| 2013/0230759 A1 | 9/2013 | Jeong et al. | |
| 2013/0280610 A1* | 10/2013 | Hwang | H01M 4/5825 |
| | | | 252/502 |
| 2014/0023905 A1 | 1/2014 | Taniyama et al. | |
| 2014/0038009 A1 | 2/2014 | Okawa et al. | |
| 2014/0041826 A1 | 2/2014 | Takeuchi et al. | |
| 2014/0070013 A1 | 3/2014 | Stanek et al. | |
| 2014/0093760 A1* | 4/2014 | Hermann | B60L 50/66 |
| | | | 429/66 |
| 2014/0117291 A1 | 5/2014 | Amatucci et al. | |
| 2014/0141300 A1 | 5/2014 | Ronning et al. | |
| 2014/0170493 A1 | 6/2014 | Holme et al. | |
| 2014/0227568 A1 | 8/2014 | Hermann | |
| 2014/0227597 A1 | 8/2014 | Nemoto et al. | |
| 2014/0265554 A1 | 9/2014 | Yang et al. | |
| 2014/0272564 A1 | 9/2014 | Holme et al. | |
| 2014/0279723 A1 | 9/2014 | McGavran et al. | |
| 2014/0284526 A1 | 9/2014 | Shan | |
| 2015/0000327 A1* | 1/2015 | Kakehashi | H01M 10/625 |
| | | | 62/434 |
| 2015/0037626 A1 | 2/2015 | Malcolm et al. | |
| 2015/0214586 A1* | 7/2015 | Yeow | H01M 10/647 |
| | | | 429/120 |
| 2015/0217622 A1* | 8/2015 | Enomoto | B60H 1/00878 |
| | | | 62/244 |
| 2015/0217623 A1* | 8/2015 | Hatakeyama | B60L 1/02 |
| | | | 429/62 |
| 2015/0243974 A1 | 8/2015 | Holme et al. | |

(56) References Cited

U.S. PATENT DOCUMENTS

| | | |
|---|---|---|
| 2015/0255998 A1 | 9/2015 | Hasegawa et al. |
| 2015/0258875 A1* | 9/2015 | Enomoto ............... B60L 58/24 |
| | | 165/104.31 |
| 2016/0049655 A1 | 2/2016 | Fasching et al. |
| 2016/0059733 A1 | 3/2016 | Hettrich et al. |
| 2016/0068123 A1 | 3/2016 | Helmhold et al. |
| 2016/0082860 A1 | 3/2016 | Marchal et al. |
| 2016/0164135 A1 | 6/2016 | Fasching et al. |
| 2016/0218401 A1 | 7/2016 | Hermann et al. |
| 2016/0380315 A1 | 12/2016 | Weicker et al. |

FOREIGN PATENT DOCUMENTS

| | | |
|---|---|---|
| JP | 3585992 B2 | 11/2004 |
| JP | 2010-110196 A | 5/2010 |
| JP | 2010-281561 | 12/2010 |
| JP | 2012-236577 | 12/2012 |
| WO | WO 2009/001916 A1 | 12/2008 |
| WO | WO 2009/120369 A2 | 10/2009 |
| WO | WO 2012/144148 | 10/2012 |
| WO | WO 2014/061761 A1 | 10/2014 |
| WO | WO 2015/010179 A1 | 1/2015 |
| WO | WO 2015/031908 | 3/2015 |
| WO | WO 2015/054320 | 4/2015 |
| WO | WO 2015/076944 | 5/2015 |
| WO | WO 2015/103548 | 7/2015 |
| WO | WO 2016/106321 | 6/2016 |

OTHER PUBLICATIONS

International Search Report and Written Opinion of PCT/US2015/010179 dated Apr. 21, 2015, 11 pages.

Plichta, Edward, et al. "Low Temperature Electrolyte for Lithium and Lithium-Ion Batteries," Proceedings of the 38th Power Sources Conference, Jun. 8-11, 1998, pp. 444-447.

U.S. Appl. No. 14/146,728, titled "Thin Film Lithium Conducting Powder Material Deposition From Flux," by Donnelly et al., filed Jan. 3, 2014.

Wang et al., "Conversion Reaction Mechanisms in Lithium Ion Batteries: Study of the Binary Metal Fluoride Electrodes", Journal of the American Chemical Society, 2011, vol. 133, pp. 18828-18836.

* cited by examiner

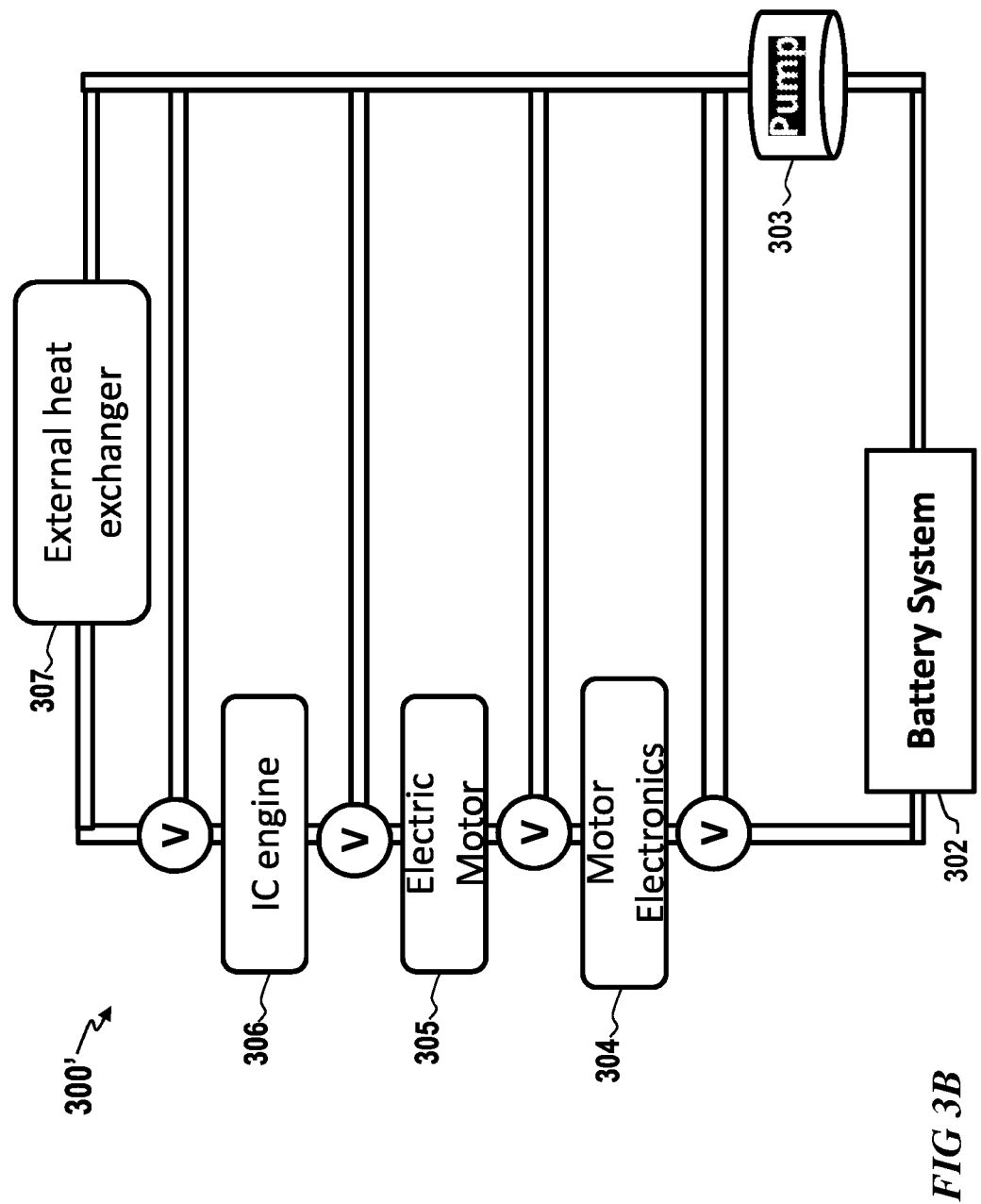

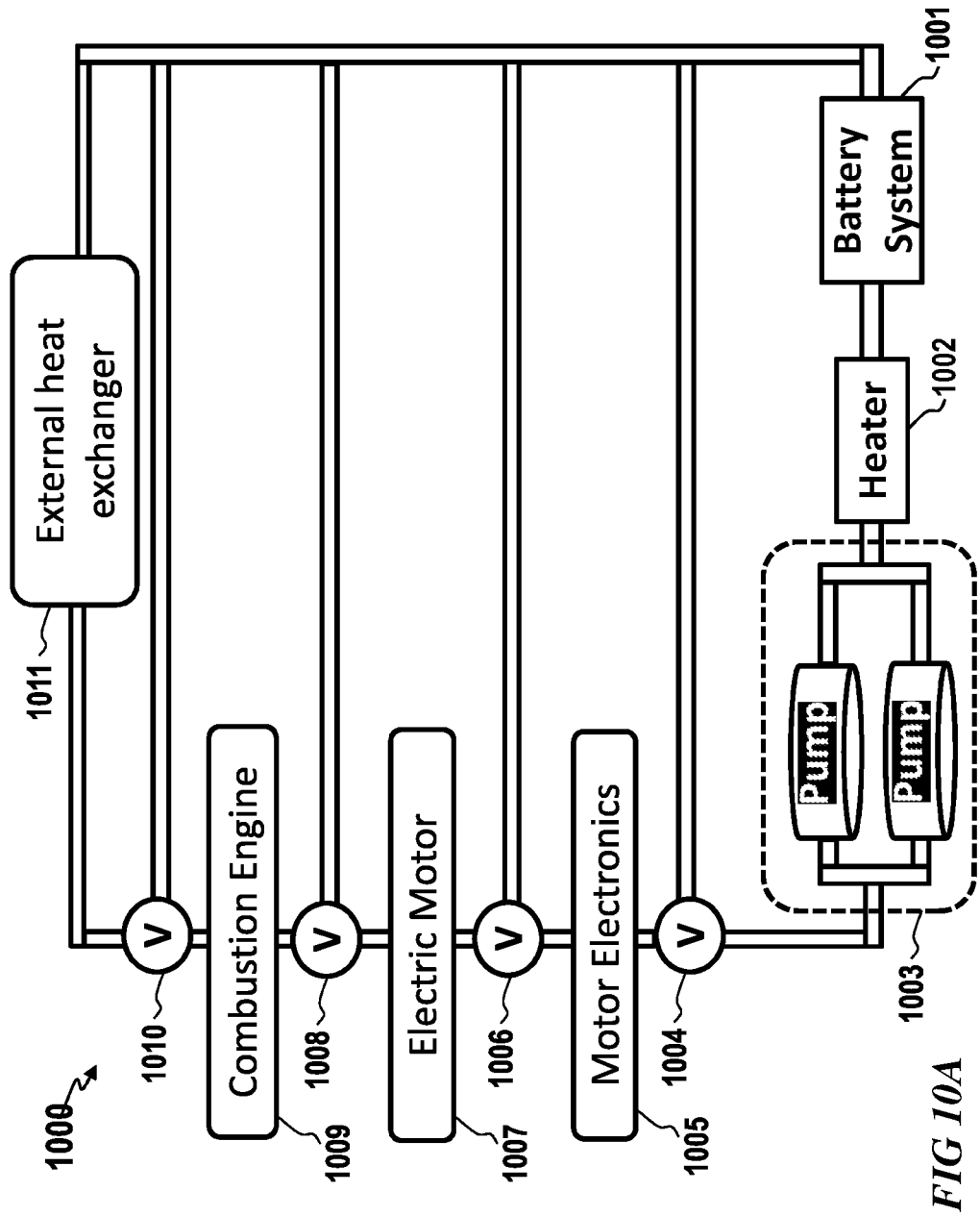

THERMAL MANAGEMENT SYSTEM FOR VEHICLES WITH AN ELECTRIC POWERTRAIN

CROSS-REFERENCES TO RELATED APPLICATIONS

The present application is a 37 C.F.R. § 1.53(b) continuation of U.S. patent application Ser. No. 17/115,713 (now U.S. Pat. No. 11,577,626), filed on Dec. 8, 2021, which is the continuation of U.S. patent application Ser. No. 16/292,147 (now U.S. Pat. No. 10,889,205), filed on Mar. 4, 2019, which is the divisional of U.S. patent application Ser. No. 15/028,358, filed on Apr. 8, 2016, which is the National Stage of PCT International Application No. PCT/US2015/010179, filed on Jan. 5, 2015, which claims the benefit of U.S. Provisional Application No. 61/923,232, filed on Jan. 3, 2014, the entire contents of which are incorporated herein by reference. This application is related to the U.S. patent application Ser. No. 13/763,636, filed on 9 Feb. 2013, entitled BATTERY SYSTEM WITH SELECTIVE THERMAL MANAGEMENT, which is incorporated by reference herein for all purposes.

BACKGROUND

Thermal management is critical to designing and operating electrified vehicles. Various components of vehicles, such as the powertrain [e.g., the engine, transmission, battery system, electric motor(s), motor power electronics, battery power electronics, on-board battery charger, 12V DC-DC converter] and climate control (e.g., cabin heat exchanger, and A/C compressor) components all have, respectively, preferred operating temperature ranges. For these components to function properly, efficiently, or optimally, thermal management systems are required to cool or heat these components appropriately and rapidly.

In electrified vehicles which include an internal combustion engine (ICE) (i.e., hybrid vehicles or plug-in hybrid vehicles), two thirds of the heat generated by the engine is typically wasted. While conventional secondary (i.e., rechargeable) batteries are adversely affected when this wasted engine heat is directly absorbed by the battery, certain new secondary batteries, which optimally operate at higher temperatures as compared to those for conventional batteries, can benefit by accepting this wasted heat and being warmed thereby. While conventional thermal management systems exist, systems are still needed to efficiently and rapidly exchange heat between these new secondary batteries and the various components of vehicle that can accept or donate heat energy. As such, there are needs in the field to which the instant invention pertains related to thermal management systems for electric vehicles which include these new secondary batteries as well as to improvements to conventional thermal management systems.

The instant disclosure provides, in part, solutions to the aforementioned challenges, as well as others, associated with exchanging heat with secondary batteries and other vehicle components.

SUMMARY

In one embodiment, set forth herein is a thermal management system for a vehicle with an electric drivetrain. This system includes a battery system including at least one battery cell having a cycle life of at least 100 cycles, and an optimal operating temperature between about 40° C. and 150° C. In some examples, this system includes a battery system including at least one battery cell having a cycle life of at least 100 cycles, and an optimal operating temperature of about 75° C. or higher. In certain examples, this system includes a battery system including at least one battery cell having a cycle life of at least 100 cycles, and an optimal operating temperature above 75° C. In some examples, this system also includes an internal combustion engine (ICE). This system also includes a shared thermal circuit thermally coupling the battery system to other vehicle components, wherein the thermal circuit includes a working fluid, at least one switch or valve for controlling the transfer of the working fluid, wherein a control system actuates the at least one switch or valve, and at least one external heat exchanger; and a control system for controlling the heat exchange between the battery system and these other components of the vehicle.

In a second embodiment, set forth herein is a thermal management system for a vehicle with an electric drivetrain. The system includes a control system, a shared thermal circuit comprising a working fluid and one or more switches. In some examples, conductive solids can be substituted for the working fluid, in which case the switches and values open and close the thermal connections to the conductive solids. The one or more switches are configured to operate based on signals received from the control system. The system also includes a battery system having a cycle life of at least 100 cycles and an optimal operating temperature between about 40° C. and 150° C. In some examples, this system includes a battery system including at least one battery cell having a cycle life of at least 100 cycles, and an optimal operating temperature of about 75° C. or higher. In some of these examples, the battery system is thermally coupled to the thermal circuit. Additionally, in some examples, the system includes an internal combustion engine module thermally coupled to the thermal circuit and the battery system via the shared thermal circuit, and at least one external heat exchanger thermally coupled to the thermal circuit. In certain examples, the external heat exchanger may optionally be removed from the thermal circuit. The control system is configured to cause the heat dissipated by the internal combustion engine module to transfer to the battery module through the shared thermal circuit.

BRIEF DESCRIPTION OF THE DRAWINGS

FIGS. 3A-C are simplified diagrams illustrating a thermal management system in series configuration according to embodiments set forth herein.

FIGS. 10A-B are simplified diagrams of a thermal management system with bidirectional flow control according to an embodiment set forth herein. The arrows in FIG. 10B illustrate one flow pattern that is possible for this system. Depending on which valves are actuated, other flow patterns are possible.

DETAILED DESCRIPTION

Figure 1A:
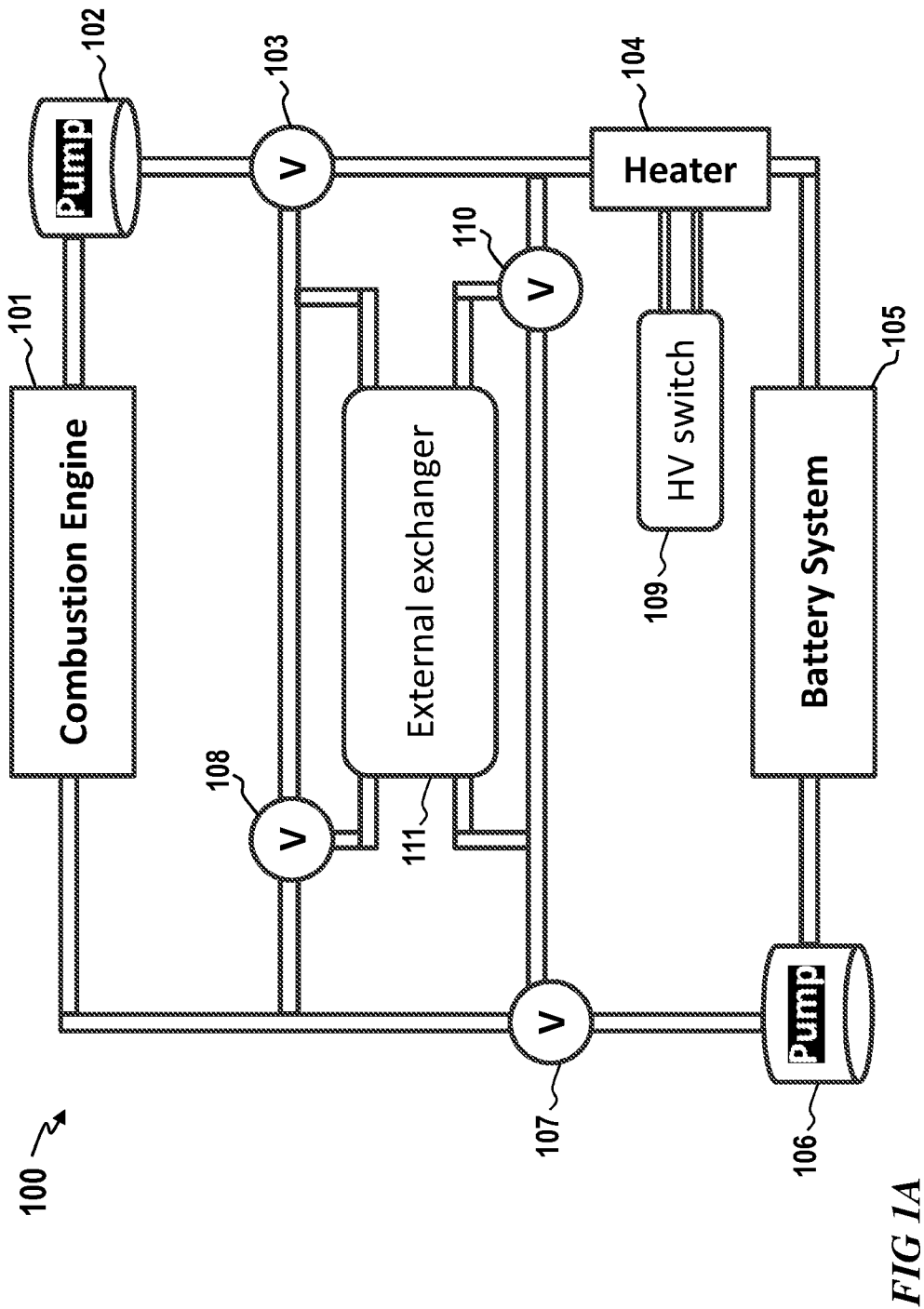
FIGS. 1A-B are simplified diagrams illustrating a thermal management system according to embodiments set forth herein.

Embodiments are directed to thermal management systems of electrified vehicles, such as plug-in hybrid electric (PHEV) and electric vehicles (EV; e.g., battery electric vehicles). More specifically, the battery system, one or more additional powertrain components (e.g. including but not limited to the engine, transmission, battery system, electric motor, motor power electronics, battery power electronics, on-board battery charger, 12V DC-DC converter), and/or cabin climate control components (e.g. including but not limited to the cabin heat exchanger, and A/C compressor) of a vehicle share a single thermal circuit or loop. The thermal management system is designed to enable a plurality of components to operate on a single thermal circuit and exchange thermally energy between the battery system, other powertrain components and optionally climate control components as needed.

By utilizing a shared thermal circuit with batteries capable of operating at high temperatures (e.g., solid state conversion chemistry batteries or batteries having a solid-state electrolyte), the battery system and, for example, the combustion engine can directly and efficiently be in fluid and thermal communication. In some examples, battery heat can be directly used to warm up a combustion engine, combustion engine heat can be directly used to warm up a battery system (or one or more batteries within a battery system), battery heat can be directly used to provide cabin heat, or all combinations thereof. A single or simple thermal circuit allows for a faster rate of heating and cooling, as less components are needed. Using the systems and methods set forth herein, a second or separate thermal circuit (e.g., including additional heat exchangers, pumps, controllers, and valves, as non-limiting examples) is therefore removed from, or rendered unnecessary for, the system. In some examples, the heat exchanger passively dissipates heat. In yet other examples, the heat exchanger actively removes heat from the system, or battery, in particular, via a heat pump.

The batteries set forth herein can operate at a high temperature, thereby allowing novel heat utilization via the shared thermal circuit, set forth in the instant disclosure, between an engine, battery system, transmission, battery system, electric motor(s), motor power electronics, battery power electronics, on-board battery charger, 12V DC-DC converter] and climate control, cabin heat exchanger, and A/C compressor, components and/or other powertrain components. For example, an internal combustion engine ("ICE") can emit tens of kilowatts of waste heat in operation. By utilizing a shared thermal circuit design according to embodiments set forth herein, waste heat from the combustion engine can be utilized to heat the battery system to its optimal operating temperature range. Similarly, the battery system can utilize the heat radiated from the radiator sized for the combustion engine heat rejection, reducing vehicle cost and improving heat rejection efficiency.

In a specific embodiment, a thermal circuit is configured to transfer heat from the ICE to the battery, and vice versa. Heat transfer is accomplished, for example, by using a heat transfer fluid (e.g., typically a water-glycol mixture that has a high specific heat capacity), which is circulated by one or more pumps. For example, the pump is controlled by a controller module, which causes the pump to circulate fluid heated by the ICE to the battery when the ICE has a high temperature and the battery is below a threshold temperature. As a part of the thermal path, switches and/or valves are used to control the flow of the heat transfer fluid. For example, after the battery reaches a desired operating temperature, valves can be used to isolate the combustion engine and battery system to stop heat transfer or dissipate heat to the ambient environment or air.

With a single thermal circuit, components (e.g. heat exchanger, pump, heat transfer fluid, and the like) of the thermal circuit are shared, thereby reducing system cost, weight, and volume. In a competitive automotive original equipment manufacturer (OEM) market, reducing system components and saving hundreds of dollars can have significant economic impact. Significant price elasticity exists in the automotive market, where small changes in price can have significant impact on vehicle sales volumes. Consequently, there is a need for automotive OEMs to reduce costs of all vehicle components, especially in instances where system performance can be held constant or improved. For example, the instantly disclosed shared thermal management system, which can modulate the heat of certain or all powertrain components (inclusive of the battery system), is a novel and substantial improvement in vehicle design for vehicles with electrified powertrains.

By reducing components such as a heat exchanger, pump, and transfer fluid, more batteries can be assembled in a given volume thus providing more energy and power to a drive train. In some examples, this can increase the driving range. In other examples, this can increase available power with respect to the vehicle's operating temperature range.

The overall weight of the vehicle is reduced, increasing performance and efficiency. The weight of a vehicle can be reduced by about 4 kg, about 8 kg, about 12 kg or about 3-15 kg in total by removing secondary thermal circuit components. In addition to the weight savings, there includes a space savings as well. As much as 15-20 L of space can be reclaimed or utilized when vehicle thermal management systems are designed as set forth herein. The additional space allows for efficient and flexible design of related or unrelated vehicle components. The amount of space reclaimed can be about 5 L, about 10 L, about 15 L or about 4 L-20 L of space, for example. As the battery system is heated more quickly and effectively, performance of the battery system increases. In some examples, the thermal circuits herein heat a battery at least 2-10 times faster than conventional heating systems. Conventional heaters can heat at about 3-5 kW. However, the thermal circuits herein, in some examples, directly heat a secondary battery using the ICE's dissipated heat at about 10 kW or higher.

In addition, a reduced number of components can improve system reliability and reduce maintenance costs. In various embodiments, transfer of waste heat from the engine to the battery module in cold start scenarios reduces or eliminates battery module energy expenditure required for self-warming and can result in a shorter time until the electric drivetrain can take over operation of the vehicle. In various embodiments, a radiator suitable for heat rejection from a combustion engine is oversized relative to the radiator designed solely for a battery system. Consequently, by sharing the radiator, the battery system can utilize enhanced heat rejection capability in the shared system, resulting in increased system efficiency, longer component life, and/or improved vehicle performance. By sharing components and uses thereof, other components can be eliminated or reduced in size as well.

Lithium ion and lithium metal batteries are utilized in automotive applications because of their high specific energy and energy density, long cycle life, high round trip efficiency, low self-discharge and long shelf life. However, soaked to cold temperatures that vehicles encounter, lithium ion and lithium metal cells exhibit poor low temperature performance. As an example, it has been reported that lithium ion cells can lose up to 88% of their room temperature capacity at $-40°$ C. The limited power and capacity observed for batteries at low temperatures is particularly problematic for all solid state batteries.

Poor low temperature performance, in the worst scenario, can impact vehicle safety where sufficient energy and power from the battery module is not available for driving, e.g. when merging onto a freeway, and in the best scenario, low vehicle performance levels, and/or driver wait times. Consequently, automotive vehicle manufacturers (OEMs) often provide more power and/or capacity than required during most temperature conditions to satisfy low temperature requirements, thereby adding cost, weight, and volume to the powertrain. In certain designs, low performance levels at cold operating temperatures may not be acceptable because they significantly and negatively impact vehicle functionality. In some other designs, the vehicle may rely on the combustion engine (if present) to start and operate the vehicle until the battery module reaches operating temperature, limiting the utility of the electric powertrain.

In some examples, set forth herein is a thermal system architecture where the battery system shares the same thermal management circuit with other powertrain components (e.g. including but not limited to the engine, transmission, battery module, electric motor, motor power electronics, battery power electronics, on-board battery charger, 12V DC-DC converter), and/or cabin climate control components (e.g. including but not limited to the cabin heat exchanger, and/or A/C compressor). As an example, the terms "shared thermal circuit", "combined thermal circuit", "single thermal loop", "direct thermal circuit" and "common thermal circuit" refer to a configuration where the heat transfer fluid or heat transfer materials are shared among the battery system and one or more powertrain components (e.g. including but not limited to the engine, transmission, electric motor(s), motor power electronics, battery power electronics, on-board battery charger, 12V DC-DC converter) and/or cabin climate control components (e.g. including but not limited to the cabin heat exchanger, and A/C compressor), of a vehicle.

Battery

In some examples, set forth herein is a battery system including one or more battery cells connected in series and/or in parallel to provide electrical power to the vehicle. Battery cells of a battery system may or may not be homogenous depending on the design of the battery system. An example of a battery system with different cell types may include cells with high power and/or excellent low temperature performance (e.g. due to a cell chemistry or architecture optimized for power or low temperature) to handle peak power requirement and cold start scenarios together with cells optimized for energy density to enable higher energy capacity. For example, the combinations of primary and boost batteries, set forth in U.S. patent application Ser. No. 13/763,636, filed on 9 Feb. 2013, entitled BATTERY SYSTEM WITH SELECTIVE THERMAL MANAGEMENT, which is incorporated by reference herein for all purposes, are non-limiting examples of battery systems with different cell types.

Depending on the implementations, there can be several variations of the thermal system set forth herein that combine the heat transfer circuit of the battery module and the one or more powertrain components (e.g. including but not limited to the engine, transmission, battery module, electric motor, motor power electronics, battery power electronics, on-board battery charger, and/or 12V DC-DC) and/or cabin climate control components (e.g. including but not limited to the cabin heat exchanger, and/or A/C compressor). Because the battery systems set forth herein can not only tolerate, but optimally perform at high temperatures, these battery systems can be thermally coupled in a shared or simple thermal circuit, in a way which would adversely affect the performance of conventional secondary batteries. In some examples, the high temperatures are temperatures above room temperature. In some other examples, the high temperatures are temperatures about $35°$ C. In other examples, the high temperatures are temperatures about $40°$ C. In yet other examples, the high temperatures are temperatures about $45°$ C. In some other examples, the high temperatures are temperatures about $50°$ C. In some examples, the high temperatures are temperatures about $55°$ C. In some other examples, the high temperatures are temperatures about $60°$ C. In some other examples, the high temperatures are temperatures about $65°$ C. In other examples, the high temperatures are temperatures about $70°$ C. In yet other examples, the high temperatures are temperatures about $75°$ C. In some other examples, the high temperatures are temperatures about $80°$ C. In some examples, the high temperatures are temperatures about $85°$ C. In some other examples, the high temperatures are temperatures about $90°$ C.

In some examples, set forth herein is a battery system comprising at least one battery cell having a cycle life of at least 100 cycles, and an optimal operating temperature between about 40° C. or higher. In some examples, set forth herein is a battery system comprising at least one battery cell having a cycle life of at least 100 cycles, and an optimal operating temperature between about 50° C. or higher. In some examples, set forth herein is a battery system comprising at least one battery cell having a cycle life of at least 100 cycles, and an optimal operating temperature between about 60° C. or higher. In some examples, set forth herein is a battery system comprising at least one battery cell having a cycle life of at least 100 cycles, and an optimal operating temperature between about 70° C. or higher. In some examples, set forth herein is a battery system comprising at least one battery cell having a cycle life of at least 100 cycles, and an optimal operating temperature between about 75° C. or higher. In some examples, set forth herein is a battery system comprising at least one battery cell having a cycle life of at least 100 cycles, and an optimal operating temperature between about 80° C. or higher.

In some examples, the high temperatures are temperatures above room temperature. In some other examples, the high temperatures are temperatures above 35° C. In other examples, the high temperatures are temperatures above 40° C. In yet other examples, the high temperatures are temperatures above 45° C. In some other examples, the high temperatures are temperatures above 50° C. In some examples, the high temperatures are temperatures above 55° C. In some other examples, the high temperatures are temperatures above 60° C. In some other examples, the high temperatures are temperatures above 65° C. In other examples, the high temperatures are temperatures above 70° C. In yet other examples, the high temperatures are temperatures above 75° C. In some other examples, the high temperatures are temperatures above 80° C. In some examples, the high temperatures are temperatures above 85° C. In some other examples, the high temperatures are temperatures above 90° C.

The battery systems set forth herein, in some examples, are placed in close proximity, immediately adjacent or in physical contact with components of the thermal circuit, e.g., an internal combustion engine. In some examples, close proximity includes one half the length of an electric vehicle in which the battery and internal combustion engine are located. In some examples, close proximity includes one quarter the length of an electric vehicle in which the battery and internal combustion engine are located. In some examples, close proximity includes one eighth the length of an electric vehicle in which the battery and internal combustion engine are located. In some examples, close proximity includes one tenth the length of an electric vehicle in which the battery and internal combustion engine are located. In some examples, close proximity includes one sixteenth the length of an electric vehicle in which the battery and internal combustion engine are located. In some examples, close proximity includes one twentieth the length of an electric vehicle in which the battery and internal combustion engine are located. In some examples, close proximity includes one thirtieth the length of an electric vehicle in which the battery and internal combustion engine are located. In some examples, close proximity includes less than one half the length of an electric vehicle in which the battery and internal combustion engine are located. In some examples, close proximity includes less than one quarter the length of an electric vehicle in which the battery and internal combustion engine are located. In some examples, close proximity includes less than one eighth the length of an electric vehicle in which the battery and internal combustion engine are located. In some examples, close proximity includes less than one sixteenth the length of an electric vehicle in which the battery and internal combustion engine are located. Merely as an example, shared thermal management systems include, but are not limited to, the following:

1. A battery system thermal loop combined with thermal loops of one or more of the following: internal combustion engine, transmission, battery module, electric motor(s), motor power electronics, battery power electronics, on-board battery charger, 12V DC-DC, other powertrain components, cabin climate control, and A/C compressor;
2. A thermal loop including a battery module and other powertrain components connected in-series or in parallel; and
3. Components arranged in different order to optimize operation.

In some examples, battery cells that are capable of operating at high temperatures are used. High temperature includes operating temperatures from about 80° C. to about 120° C. High temperature includes above 80° C., 80° C. to 100° C., 90-110° C., over 100° C., and about 85-115° C., as examples. In some examples, rechargeable battery cells utilizing a solid state electrolyte capable of operating at high temperatures are implemented as a part of the shared thermal circuit technology. It is to be understood that there may be different types of rechargeable battery cells capable of operating at high temperatures.

Examples of solid state electrolytes suitable for use with the disclosure herein include those found in International PCT Patent Application No. PCT/US14/38283, entitled SOLID STATE CATHOLYTE OR ELECTROLYTE FOR BATTERY USING $Li_4MP_BS_C$ (M=Si, Ge, AND/OR Sn), filed May 15, 2014, the contents of which are incorporated by reference in their entirety. Examples of solid state electrolytes suitable for use with the disclosure herein include those found in International PCT Patent Application No. PCT/US2014/059575, entitled GARNET MATERIALS FOR LI SECONDARY BATTERIES AND METHODS OF MAKING AND USING GARNET MATERIALS, filed Oct. 7, 2014, the contents of which are incorporated by reference in their entirety. Secondary batteries that include these solid state electrolytes are well suited for the thermal management systems set forth herein.

Examples of high temperature battery and battery systems suitable for use with the thermal management systems set forth herein include, but are not limited to those found in U.S. Published patent application Ser. No. 13/922,214, entitled NANOSTRUCTURED MATERIALS FOR ELECTROCHEMICAL CONVERSION REACTIONS, and Ser. No. 13/749,706, entitled SOLID STATE ENERGY STORAGE DEVICES, filed on Jun. 19, 2013 and Jan. 25, 2013, respectively. The disclosures of which are herein incorporated by reference in their entireties. Other examples include those found in U.S. Provisional Patent Application No. 62/088,461, entitled CATHODE WITH NANOCOMPOSITE PARTICLE OF CONVERSION CHEMISTRY MATERIAL AND MIXED ELECTRONIC IONIC CONDUCTOR, filed Dec. 5, 2014. Other examples include those found in U.S. Provisional Patent Application No. 62/096,510, entitled LITHIUM RICH NICKEL MANGANESE COBALT OXIDE (LR-NMC), filed Dec. 23, 2014. The contents of these applications are incorporated by reference in their entirety.

Solid state conversion chemistry batteries are well suited for use with the thermal management systems set forth herein and often perform well at high temperatures. Some examples of solid state conversion chemistry batteries include transition metal fluoride batteries. Hybrid conversion chemistry and intercalation batteries are also suitable for use with the thermal management systems set forth herein.

In some examples, a positive electrode material can be characterized by particles or nanodomains having a median characteristic dimension of about 20 nm or less. These include (i) particles or nanodomains of a metal selected from the group consisting of iron, cobalt, manganese, copper, nickel, bismuth and alloys thereof, and (ii) particles or nanodomains of lithium fluoride.

In one implementation, the metal is iron, manganese or cobalt and the mole ratio of metal to lithium fluoride is about 2 to 8. In another implementation, the metal is copper or nickel and the mole ratio of metal to lithium fluoride is about 1 to 5. In certain embodiments, the metal is an alloy of iron with cobalt, copper, nickel and/or manganese.

In certain embodiments, the individual particles additionally include a fluoride of the metal. In some cases, the positive electrode material additionally includes an iron fluoride such as ferric fluoride. For example, the metal may be iron and the particles or nanodomains further include ferric fluoride.

In some examples, the positive electrode useful with the high operating temperature batteries and battery cells described herein includes one or more materials selected from conversion chemistry material, such as, but are not limited to, LiF, Fe, Cu, Ni, $FeF_2$, $FeO_dF_{3-2d}$, $FeF_3$, $CoF_3$, $CoF_2$, $CuF_2$, $NiF_2$, where $0<d<0.5$, and the like, materials set forth in in U.S. Patent Publication No. 2014/0117291, filed Oct. 25, 2013, and entitled METAL FLUORIDE COMPOSITIONS FOR SELF FORMED BATTERIES, materials set forth in in U.S. Provisional Patent Application No. 62/038,059, filed Aug. 15, 2014, entitled DOPED CONVERSION MATERIALS FOR SECONDARY BATTERY CATHODES, materials set forth in in U.S. Patent Application Publication No. 2014/0170493, entitled NANOSTRUCTURED MATERIALS FOR ELECTROCHEMICAL CONVERSION REACTIONS, and filed Jun. 19, 2013 as U.S. patent application Ser. No. 13/922,214, and materials such as, but not limited to NCA (lithium nickel cobalt aluminum oxide), LMNO (lithium manganese nickel oxide), NMC (lithium nickel manganese cobalt oxide), LCO (lithium cobalt oxide, i.e., $LiCoO_2$), nickel fluoride ($NiF_x$, wherein x is from 0 to 2.5), copper fluoride ($CuF_y$, wherein y is from 0 to 2.5), or $FeF_z$ (wherein z is selected from 0 to 3.5).

The positive electrode material can additionally include (iii) a conductive additive. In some cases, the conductive additive is a mixed ion-electron conductor. In some cases, the conductive additive is a lithium ion conductor. In some implementations, the lithium ion conductor is or includes thio-LISICON, garnet, antiperovskite, lithium sulfide, FeS, $FeS_2$, copper sulfide, titanium sulfide, $Li_2S$—$P_2S_5$, lithium iron sulfide, $Li_2S$—$SiS_2$, $Li_2S$—$SiS_2$—LiI, $Li_2S$—$SiS_2$—$Al_2S_3$, $Li_2S$—$SiS_2$—$GeS_2$, $Li_2S$—$SiS_2$—$P_2S_5$, $Li_2S$—$P_2S_5$, $Li_2S$—$GeS_2$—$Ga_2S_3$, or $Li_{10}GeP_2S_{12}$.

In some examples of batteries suitable for use with the thermal management systems set forth herein, the positive electrodes can be characterized by the following features: (a) a current collector; and (b) electrochemically active material in electrical communication with the current collector. The electrochemically active material includes (i) a metal component, and (ii) a lithium compound component intermixed with the metal component on a distance scale of about 20 nm or less. Further, the electrochemically active material, when fully charged to form a compound of the metal component and an anion of the lithium compound, has a reversible specific capacity of about 350 mAh/g or greater when discharged with lithium ions at a rate of at least about 200 mA/g. In some cases, the electrochemically active material is provided in a layer having a thickness of between about 10 nm and 300 μm.

In some examples of batteries suitable for use with the thermal management systems set forth herein, the positive electrode additionally includes a conductivity enhancing agent such as an electron conductor component and/or an ion conductor component. Some positive electrodes include a mixed ion-electron conductor component. The mixed ion-electron conductor component can contain less than about 30 percent by weight of the cathode. Examples of the mixed ion-electron conductor component include thio-LISICON, garnet, lithium sulfide, FeS, $FeS_2$, copper sulfide, titanium sulfide, $Li_2S$—$P_2S_5$, lithium iron sulfide, $Li_2S$—$SiS_2$, $Li_2S$ $Li_2S$—$SiS_2$—$Al_2S_3$, $Li_2S$—$SiS_2$—$GeS_2$, $Li_2S$—$SiS_2$—$P_2S_5$, $Li_2S$—$P_2S_5$, $Li_2S$— $GeS_2$—$Ga_2S_3$, and $Li_{10}GeP_2S_{12}$. In some embodiments, the mixed ion-electron conductor component has a glassy structure.

In some examples of batteries suitable for use with the thermal management systems set forth herein, the lithium compound component is selected from lithium halides, lithium sulfides, lithium sulfur-halides, lithium oxides, lithium nitrides, lithium phosphides, and lithium selenides. In one example, the lithium compound component is lithium fluoride. In a further example, the lithium compound component is lithium fluoride and the metal component is manganese, cobalt, copper, iron, or an alloy of any of these. In some positive electrodes, the lithium compound component contains particles or nanodomains having a median characteristic length scale of about 5 nm or less. In certain embodiments, the lithium compound component includes an anion that forms a metal compound with the metal on charge, and the metal compound and lithium ions undergo a reaction to produce the metal and the lithium compound component, and the reaction has a Gibbs free energy of at least about 500 kJ/mol.

In some examples of batteries suitable for use with the thermal management systems set forth herein, the batteries are characterized by the following features: (i) an anode, (ii) a solid-state electrolyte, and (iii) a cathode including (a) a current collector, (b) electrochemically active material in electrical communication with the current collector. In these examples, the electrochemically active material includes (i) a metal component, and (ii) a lithium compound component intermixed with the metal component on a distance scale of about 20 nm or less. Further, the electrochemically active material has a reversible specific capacity of about 600 mAh/g or greater when discharged with lithium ions at a rate of at least about 200 mA/g at 50° C. between 1 and 4V versus a Li.

In some examples of batteries suitable for use with the thermal management systems set forth herein, the anode, solid state electrolyte, and cathode, together provide a stack of about 1 μm to 10 μm thickness. In some of these designs, the electrochemically active material is provided in a layer having a thickness of between about 10 nm and 300 nm.

In some examples, the electrochemically active material has a reversible specific capacity of about 700 mAh/g or greater when discharged with lithium ions at a rate of at least about 200 mA/g. In some examples, the device has an average voltage hysteresis less than about 1V when cycled at a temperature of 100° C. and a charge rate of about 200 mAh/g of cathode active material.

In another aspect, the disclosure pertains to battery devices characterized by the following features: (a) an anode region containing lithium; (b) an electrolyte region; (c) a cathode region containing a thickness of lithium fluoride material configured in an amorphous state; and (d) a plurality of iron metal particulate species spatially disposed within an interior region of the thickness of lithium fluoride to form a lithiated conversion material. Further, the battery device has an energy density characterizing the cathode region of greater than about 80% of a theoretical energy density of the cathode region. In certain embodiments, the first plurality of iron metal species is characterized by a diameter of about 5 nm to 0.2 nm. In certain embodiments, the thickness of lithium fluoride material is characterized by a thickness of 30 nm to 0.2 nm. In some cases, the thickness of lithium fluoride material is homogeneous. In certain embodiments, the cathode region is characterized by an iron to fluorine to lithium ratio of about 1:3:3. In certain embodiments, the cathode region is characterized by an iron to fluorine to lithium ratio from about 1:1.5:1.5 to 1:4.5:4.5.

In some examples, with the structure described above, the device can have an energy density of between 5 and 1000 Wh/kg, an energy density of between 10 and 650 Wh/kg, or an energy density of between 50 and 500 Wh/kg. In certain embodiment, an energy density can greater than 50 Wh/kg, or greater than 100 Wh/kg.

Definitions

As used herein, "control system", refers to a device, or set of devices, that manages, commands, directs or regulates the behavior of other devices or systems. Control systems include, but are not limited to, a computer, a microprocessor, a microcontroller or a logic circuit, that actuate the valves and switches in the thermal circuit in order to permit the working fluid, therein, to flow in one direction or another direction, or not at all. In certain instances, the microprocessor can be a field programmable gate array (FPGA). Control systems can also include temperature responsive devices (e.g., a thermostat) which sends or receives signals depending on the temperature of the components of the control system or the system controlled by the control system. In some examples, the control system may include a temperature-activated valve apparatus.

As used herein, "control module," refers to an enclosure containing circuit boards preprogrammed with software containing the logic used to determine responses to various sensor inputs. The controller module software has output signals which can actuate pumps or valves at intervals according to its internal logic.

As used herein, "heat exchanger", refers to a device for transferring heat from one medium to another. Examples of heat exchangers include radiators, which can include coils, plates, fins, pipes, and combinations thereof.

As used herein, the phrase "battery cell" shall mean a single cell including a positive electrode and a negative electrode, which have ionic communication between the two using an electrolyte. In some embodiments, the same battery cell includes multiple positive electrodes and/or multiple negative electrodes enclosed in one container.

As used herein, the phrase "battery system" shall mean an assembly of multiple battery cells packaged for use as a unit. A battery system may include any number of battery cells. These cells may be interconnected using in series connections, parallel connections, and various combinations thereof.

As used herein, the phrase "optimal operating temperature," shall, in the context of a battery cell, mean the temperature at which the battery cell is capable of outputting greater than 50% power of the rated power for the battery cell. In certain examples, the "optimal operating temperature," shall, in the context of a battery cell, mean the temperature at which the battery cell operates at a peak efficiency while meeting automotive safety and life requirements.

As used herein, "fluid", refers to gases, liquids, gels and combinations thereof. A cooling fluid, or coolant, assists in transferring heat within a thermal circuit. In some examples, a solid conductor may be substituted for a heat transfer fluid.

As used herein, "switch", refers to a device for making and breaking the connection in an electric circuit.

As used herein, "thermally coupled", refers to two or more components or devices in communication, such that they are capable of exchanging (i.e, receiving or dissipating) heat between two or more of the components or devices. Thermally coupled devices can be in close proximity or separated by pipes or other medium for transferring or exchanging heat.

As used herein, a "thermal loop," refers to a circuit including at least a circulating fluid, one or more pumps, a heat exchanger, optionally an electric fluid heater, and optionally valves to control flow. In some examples, the thermal loop optionally includes a port to fill the loop with fluid, and also optionally a reservoir tank. The thermal loop functions to transport and direct heat to or from the battery and, if necessary, reject this heat to another loop or directly to ambient air.

As used herein, "powertrain", refers to one or more of an engine, transmission, battery system, electric motor(s), motor power electronics, battery power electronics, on-board battery charger, and 12V DC-DC converter.

As used herein, "dissipate", refers to dispersing, passively and spontaneously. In some examples here, heat is received or dissipated passively and without energy actively being expended using the thermal management systems set forth herein.

As used herein, "drivetrain", refers to the system in a motor vehicle that connects the transmission to the drive axles. A hybrid vehicle can include an electric drivetrain, for example.

As used herein, "conversion chemistry", refers to a material that undergoes a chemical reaction during the charging and discharging cycles of a secondary battery. For example, a conversion material can include LiF and Fe, $FeF_3$, LiF and Cu, $CuF_2$, LiF and Ni, $NiF_2$ or a combination thereof.

As used herein, "intercalation chemistry material," refers to a material that undergoes a lithium insertion reaction during the charging and discharging cycles of a secondary battery. For example, intercalation chemistry materials include $LiFePO_4$ and $LiCoO_2$. In these materials, $Li^+$ inserts into and also deintercalates out of the intercalation material during the discharging and charging cycles of a secondary battery.

Figure 1B:
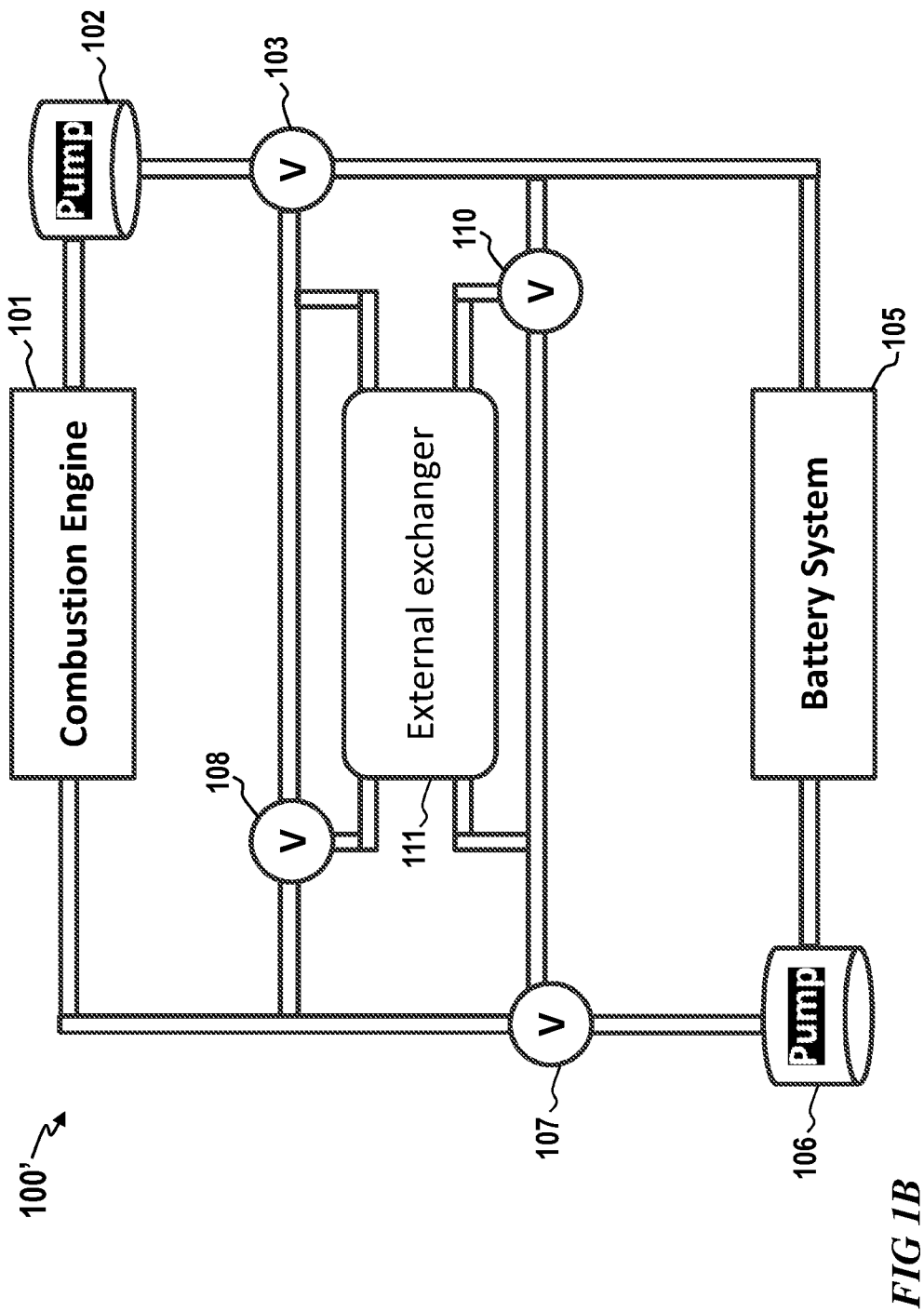

FIG. 1A is a simplified diagram illustrating a thermal management system according to an embodiment set forth herein. As shown in FIG. 1A, the shared thermal management system 100 of a vehicle comprises various components for managing thermal profiles of combustion engine 101 and battery system 105. For example, the combustion engine 101 can be an internal combustion engine (e.g., gasoline, diesel engine, etc.) or other types of engine, where a large amount of heat is dissipated during operation. In some examples, the internal combustion engine can be substituted for a fuel cell. In some of these examples, fuel cells are selected from cells having a proton exchange membrane (PEM). Typically, a large radiator is needed to dissipate the heat generated by the combustion engine 101. The battery system 105, among other features, is configured to power electrical components of the vehicles. In various embodiments, the vehicle is hybrid and relies on both combustion engine 101 and an electric motor (not shown), and the electric motor is at times powered by the battery module 105. In low temperature (typically around or below freezing), the battery module 105 may have reduced performance. It is common practice in plug-in hybrid electric vehicles for the combustion engine 101 to power the vehicle when the battery module is soaked to a low temperature. The heat dissipated by the combustion engine 101 is transferred to the battery module 105 through a shared thermal path. As shown, the shared thermal circuit comprises pumps 102 and 106, valves 103, 108, 107, and 110. Additionally, heater 104 and external exchanger 111 are also parts of the shared thermal path. For example, the heater 104 and heater high voltage (HV) switch 109 are implemented with an electrical heater, which is powered by the battery module. The electric heater may be powered by the combustion engine 101 through a motor module that converts the power generated by the combustion engine 101 to electricity for powering the electric heater. Other implementations are possible as well. Heat transfer fluid facilitates heat transfer from the combustion engine 101 to the battery system 105, and vice versa. For example, in the cold-start scenario described above, heat generated by the combustion engine 101 is absorbed by the heat transfer fluid and pumped by the pump 102 to the battery module 105. The valves as shown in FIG. 1A are connected to a control system. In a cold start scenario, the valves only allow heated fluid to transfer from the combustion engine 101 to the battery module 105, and the heat transfer fluid bypasses the external heat exchanger in order not to lose thermal energy to the outside environment. FIG. 1B shows an embodiment in which the heater 104 (and accompanying switch 109) are optional and absent. In some examples, external exchanger 111 can comprise one, two, or more heat exchangers thermally linked, connected, or combined.

As mentioned above, the battery system 105 comprises battery cells capable of operating at high temperature. For example, the battery system 105, with its own significant thermal mass, can provide a heat reservoir to facilitate cooling of the combustion engine 101, instead of using the external heat exchanger. The method of cooling the combustion engine has the advantage that no external airflow or fans are required, allowing the vehicle to maintain optimum aerodynamic shape.

In certain applications, the battery module 105 can be configured to facilitate warming of the combustion engine 101. For example, the combustion engine 101 may be a diesel engine, which can be challenging to start in low temperature. In certain implementations, the combustion engine 101 may be warmed in advance of operation to reduce emissions and improve performance before operation. In a specific embodiment, the combustion engine 101 may be an internal combustion engine of a plug-in hybrid vehicle. In plug-in hybrid vehicles, the ICE often may not be started when the vehicle is first operated as the battery can provide the energy to power the vehicle for a certain distance (e.g. 10, 20, 30 or more miles). It is to be appreciated that there is a challenge of operating the ICE when it is cold with full performance and meeting all requirements (such as emission standards). In this use case, the battery module 105 warms up to a high temperature while powering the vehicle, and subsequently, while pump 106 is on, valves 107 and 103 are actuated to thermally couple the battery system to the ICE and to pre-warm the combustion engine 101 in advance of its operation. This process allows the engine to start operating at a warmer temperature, reducing emissions and improving performance. Another benefit is reduced wear and tear on the engine.

Figure 3A:
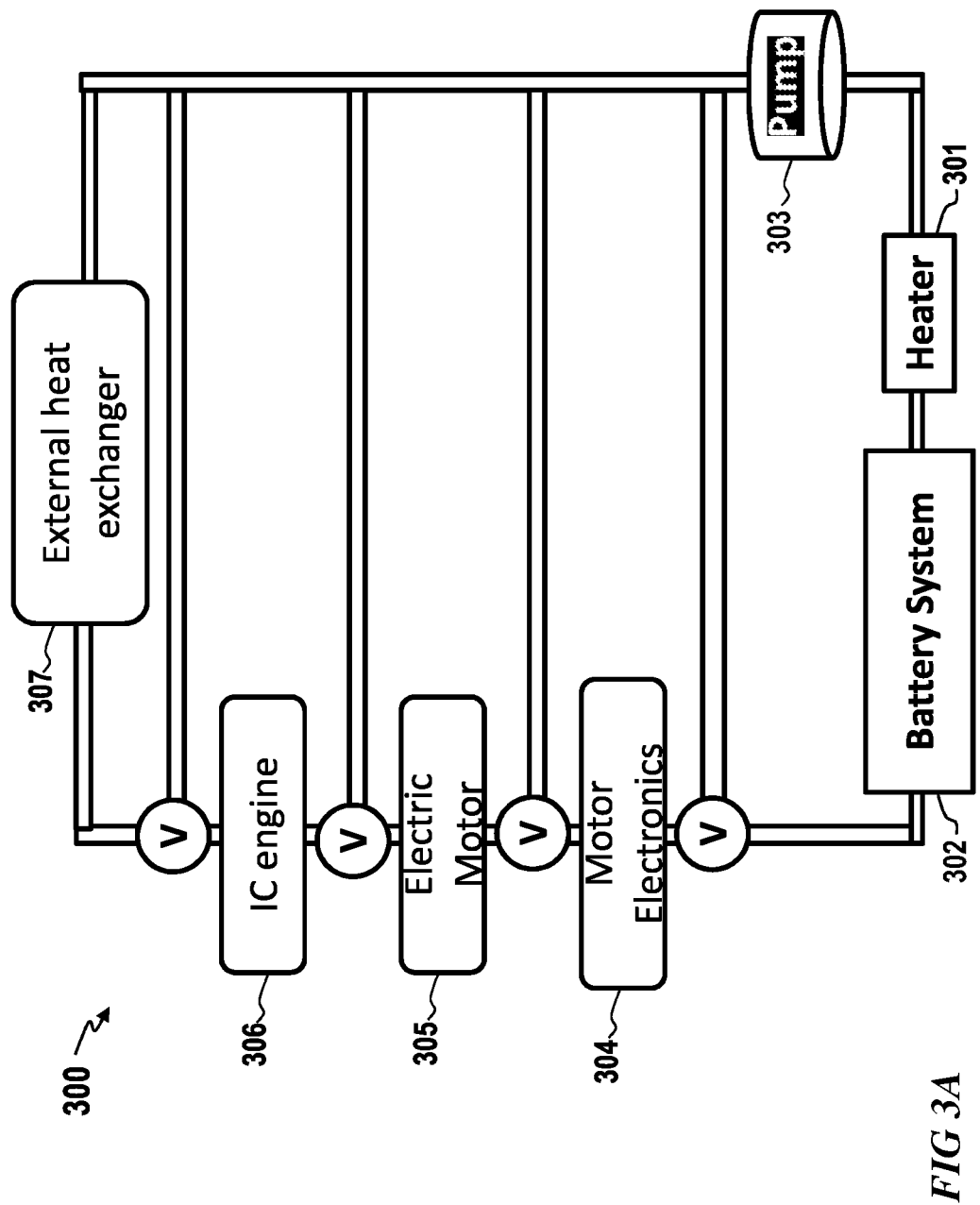

As another example, the same operation can be used by the battery system 302 shown in FIG. 3A to obtain cooling by dissipating heat into the engine 306. Internal combustion engines typically weighs hundreds of pounds, and thus have a high heat capacity. In some use cases, the temperature of the combustion engine 306 may be lower than the temperature of the battery module 302 and lower than ambient temperature. In some examples, so long as the battery is warmer than the ICE, the ICE may be used as a thermal sink. In those cases, battery system 302 can be cooled by transferring heat to the engine 306, with or without the use of the external heat exchanger 307. Utilizing the thermal mass of the internal combustion engine 306 for heat removal may be more effective than heat dissipation through the external heat exchanger 307.

Figure 8A:
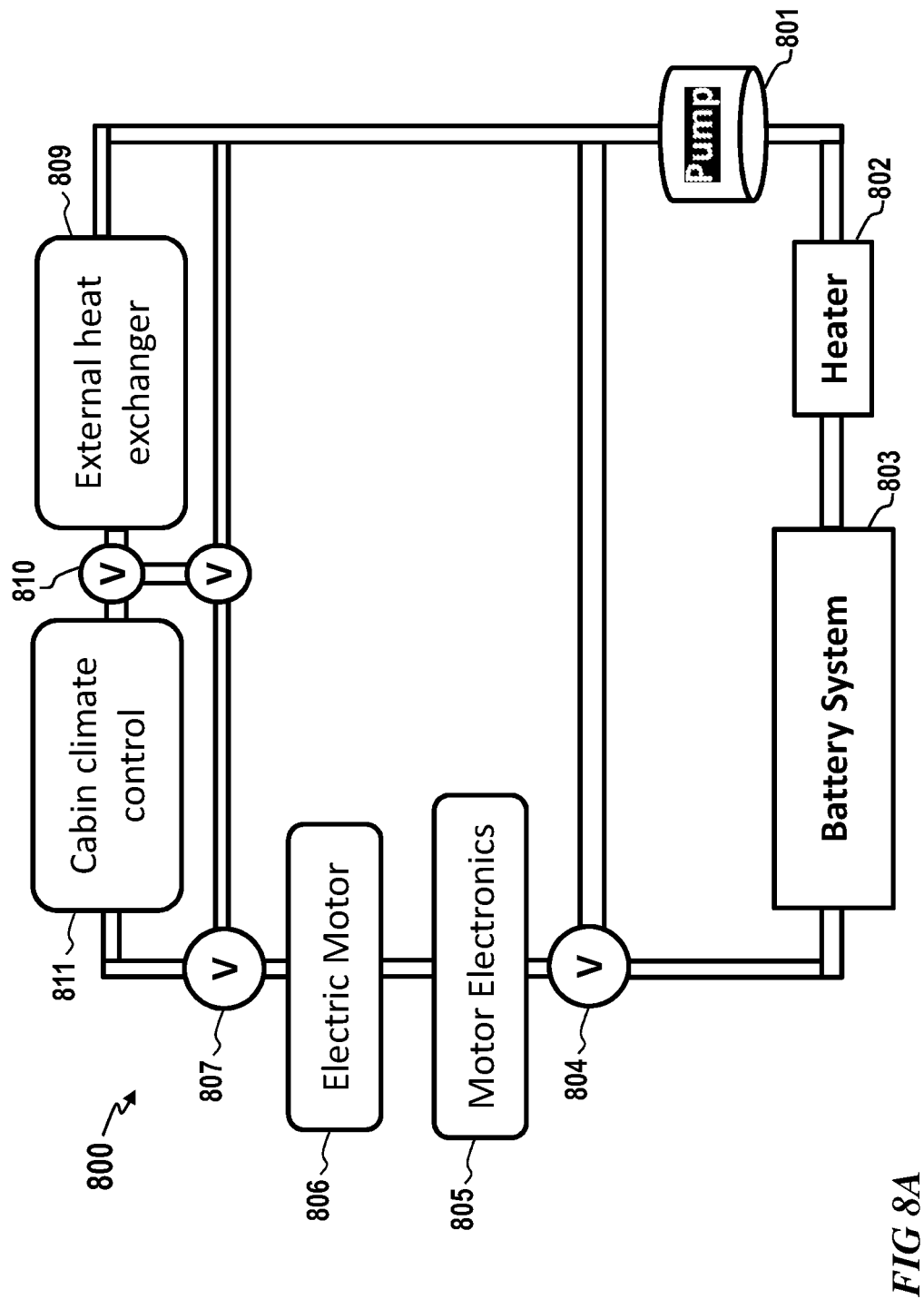
FIGS. 8A-B are simplified diagrams illustrating operation of a thermal management system with a shared thermal path where climate control module draws heat from various powertrain components according to an embodiment set forth herein. The arrows in FIG. 8B illustrate one flow pattern that is possible for this system. Depending on which valves are actuated, other flow patterns are possible.

Now referring back to FIG. 1A. The heat generated by the battery system 105 can be used by the climate control module of the vehicle to provide heating for the interior of the vehicle. In addition to the heat dissipation of the combustion engine 101, the heat dissipated by the battery module 105 can be used for heating the vehicle interior, which is, in some examples, useful when the combustion engine 101 is not operating or in an electric vehicle without a combustion engine, as shown in FIG. 8A. In some examples, the interior of the car is heated using the waste heat dissipated by the battery. This example is beneficial because it efficiently utilizes wasted heat from the battery as useful heat for the interior of the car. In other examples, the battery is used to power a heater which, in turn, is used to heat the interior of the car.

It is to be appreciated that thermal system illustrated in FIG. 3A has a shared thermal path, wherein various heat-generating components can transfer heat to one another and to the external heat exchanger using a single thermal path. In certain embodiments, various components shown in FIG. 3A can operate at a high temperature (e.g., up to 150° C.). For example, when the ICE operates during hot ambient temperature, the heat transfer fluid (e.g., coolant) can reach over 100° C. before reaching the radiator for heat dissipation. Various components shown in FIG. 3A can have different operating temperature ranges. Thus, components in a shared thermal loop may be located specifically so as to match their operating temperatures and optimize the system. While FIG. 3A shows only one possible arrangement of components, other configurations are possible (see FIG. 3C, for example, in which the electric motor 305 and ICE 306 are in direct thermal communication). FIG. 3B, for example, shows an embodiment in which the heater 301 is optional. In a specific embodiment, the battery system is capable of operating at a temperature of up to about 150° C.

Figure 2:
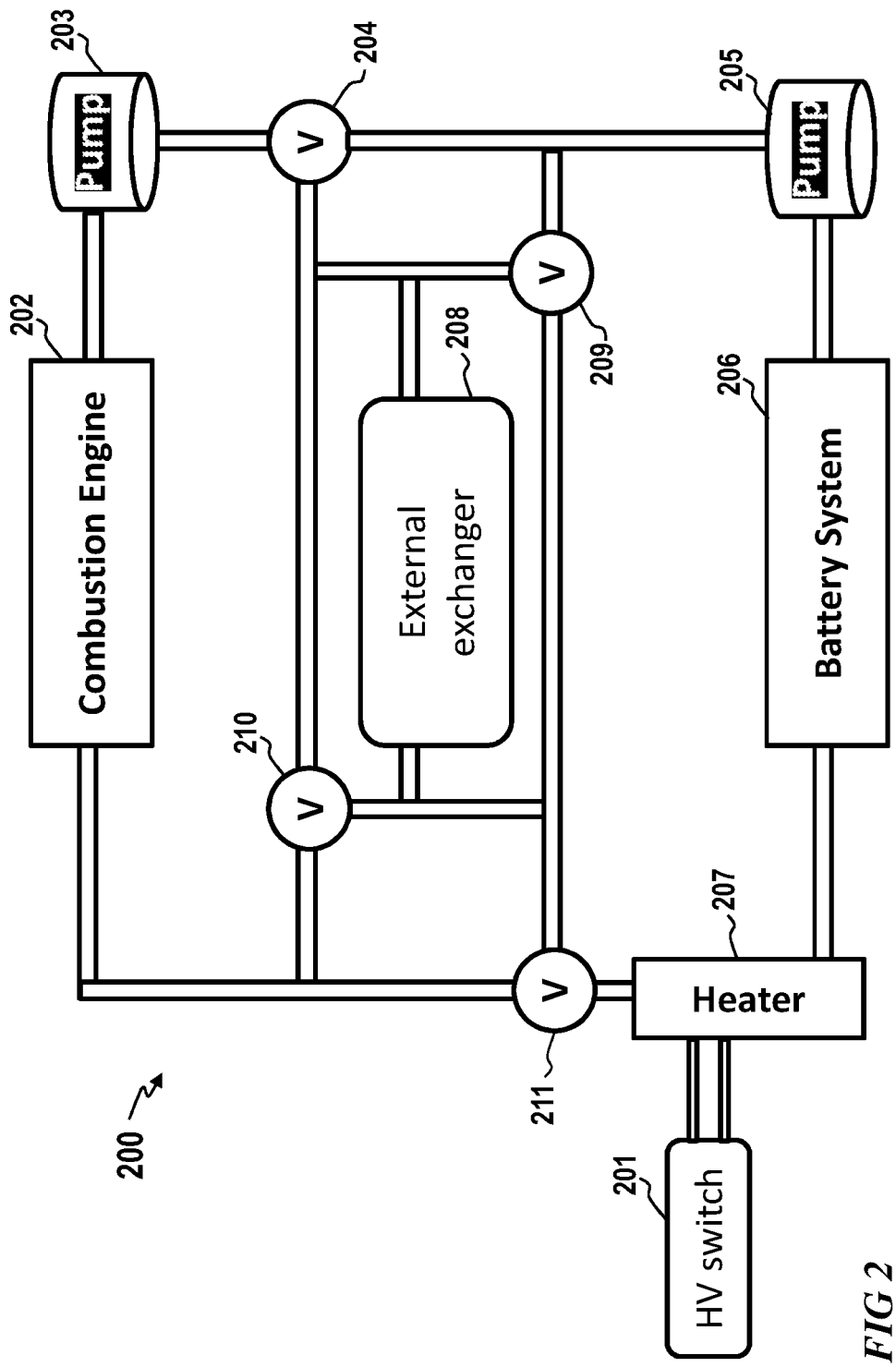
FIG. 2 is a simplified diagram illustrating an alternative thermal management system according to an embodiment set forth herein.

FIG. 2 is a simplified diagram illustrating an alternative thermal management system according to an embodiment set forth herein. The thermal management system 200 includes an HV switch 201 that controls the heater 207. For example, the HV switch is coupled to a control system. The battery module 206 is thermally coupled to the thermal circuit and the components linked thereto by the pump 205, which pumps heated fluid from the battery module to the combustion engine 202 as needed. It is to be appreciated that the pumps as shown may be implemented using a plurality of pumping devices. For example, multiple pumps devices may be coupled to one another in series to implement the pump 205. By having more than one pump to carry the pumping function, it provides redundancy in case of pump failure. In addition, the placement of pumps can be configured to reduce the risk of failures. For example, pumps may be positioned before heaters and heat generating components. In a specific embodiment, the pump 203 is placed on the left side of the combustion engine to pump heat transfer fluid to the combustion engine 202. The valves 204, 211, 209, and 210 help control the flow of heat transfer fluid. For example, the valves may be implemented using various types of switches. For example, pump and valve configurations and implementations are described in U.S. patent application Ser. No. 13/428,269, filed 23 Mar. 2013, entitled "Thermal Management System with Dual Mode Coolant Loops", now U.S. Pat. No. 8,402,776, and published as US 2012-0183815 A1, which is incorporated by reference herein. It is to be appreciated that thermal system illustrated in FIG. 2 has a shared thermal path, wherein various heat-generating elements can transfer heat to one another using the shared thermal path.

FIG. 3A is a simplified diagram illustrating a thermal management system in series configuration according to an embodiment set forth herein. It is to be appreciated that the system shown in FIG. 3A allows the battery system, internal combustion engine, electric motor, motor electronics, and/or optionally other components to share a single thermal system, which includes a heat transfer circuit, a heat exchanger, and a pumping device. As an example, in the embodiment shown in FIG. 3A, all thermal elements are configured in series. More specifically, the heater 301, the battery module 302, pump 303, motor electronics 304, electric motor 305, the combustion engine 306, and the external heat exchanger 307 are in a series configuration as a part of the thermal circuit. Other arrangements with certain components connected in series and in parallel are possible. It is to be noted that one or more components in the circuit can be configured with a bypass to prevent heating or cooling it.

Figure 4A:
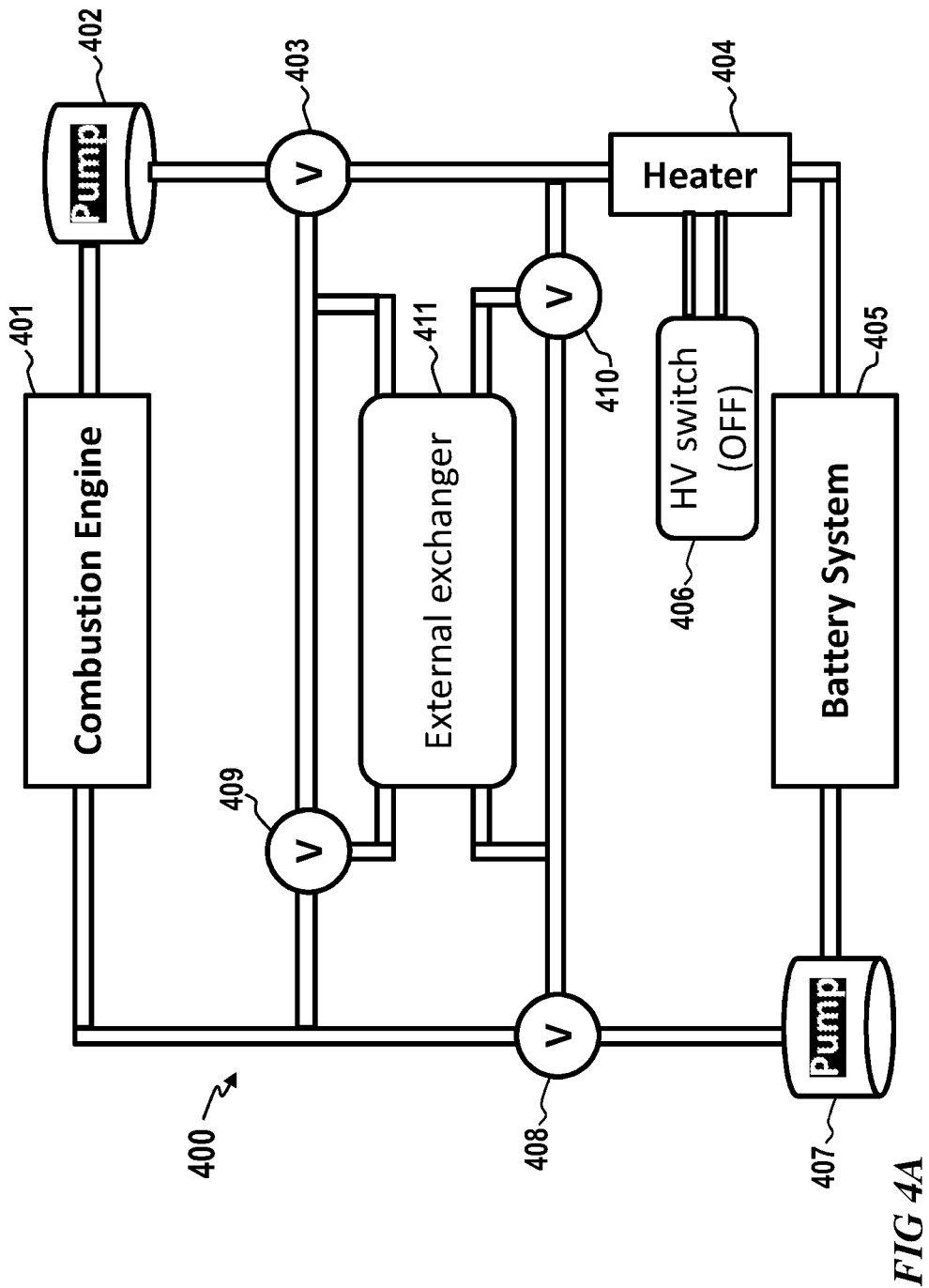
FIGS. 4A-B are simplified diagrams illustrating operation of a thermal management system where engine heat is advantageously used by the battery system during cold start according to an embodiment set forth herein. The arrows in FIG. 4B illustrate one flow pattern that is possible for this system. Depending on which valves are actuated, other flow patterns are possible.
Figure 4B:
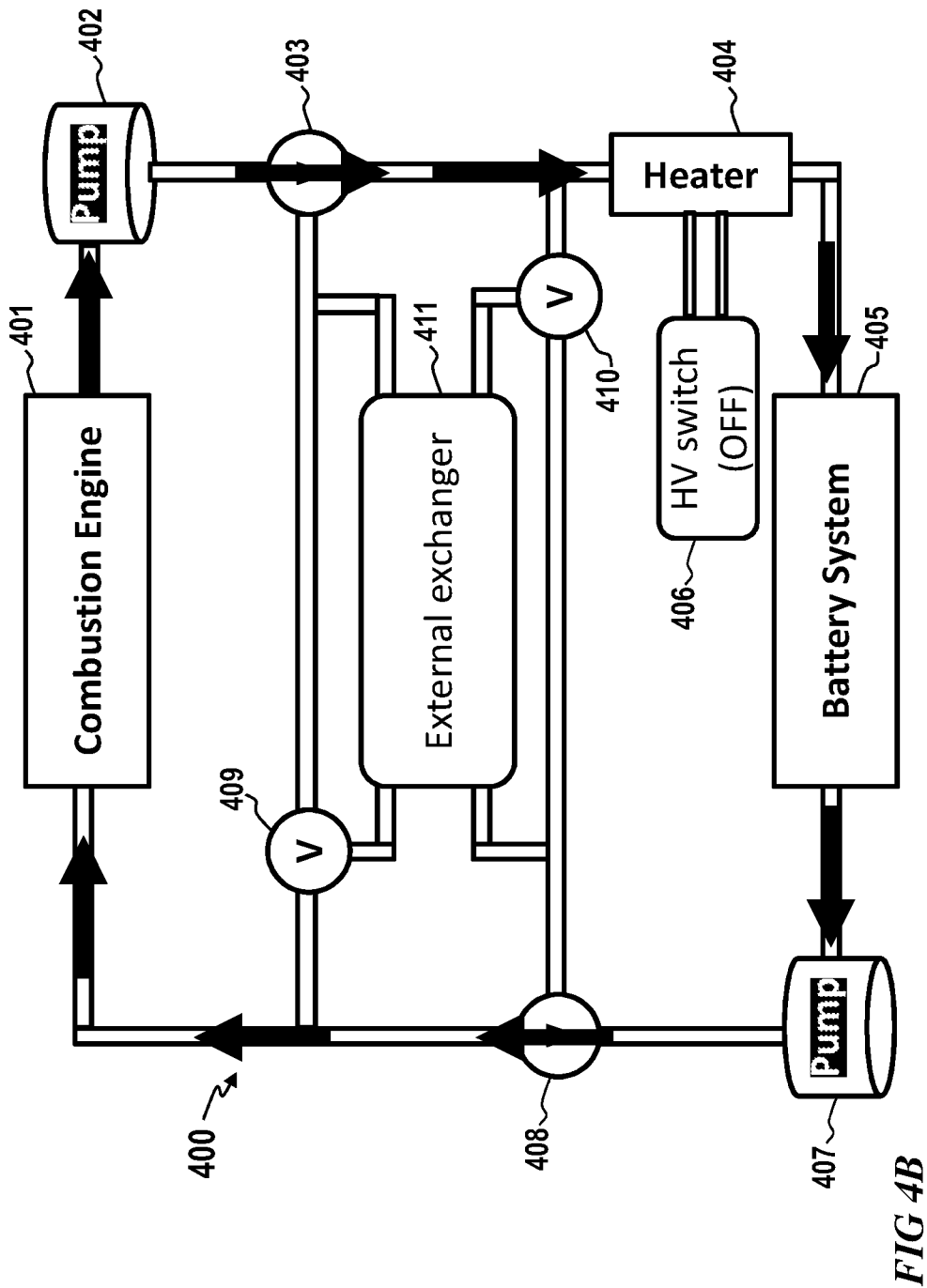

FIG. 4A is a simplified diagram illustrating operation of a thermal management system where engine heat is used by a battery system according to an embodiment set forth herein. As shown in FIG. 4A, the combustion engine 401, the pump 402, the valve 403, the heater 404, the battery module 405, the pump 407, and the valve 409 form one of several thermal circuits. In some examples, the heater is not operating. For example, when the battery system is at a low temperature, if the combustion engine 401 is operating, the heat generated by the combustion engine 401 can be transferred to the battery system 405 to warm up the battery cells. As another example, if the battery system 405 is at a high temperature and the combustion engine 401 needs to be heated, the heat is transferred from the battery system 405 to the combustion engine. Depending on the application, the heater 404 can be operating, in which case the heat generated by the heater 404 is used to warm up both the battery system 405 and, optionally, the combustion engine 401. It is to be appreciated that in this embodiment, the battery system can dissipate heat into the engine as desired to utilize lower temperature working fluid in the engine and/or the engine thermal mass as an alternative to the heat exchanger. FIG. 4B illustrates one possible flow pattern, for example.

Figure 5A:
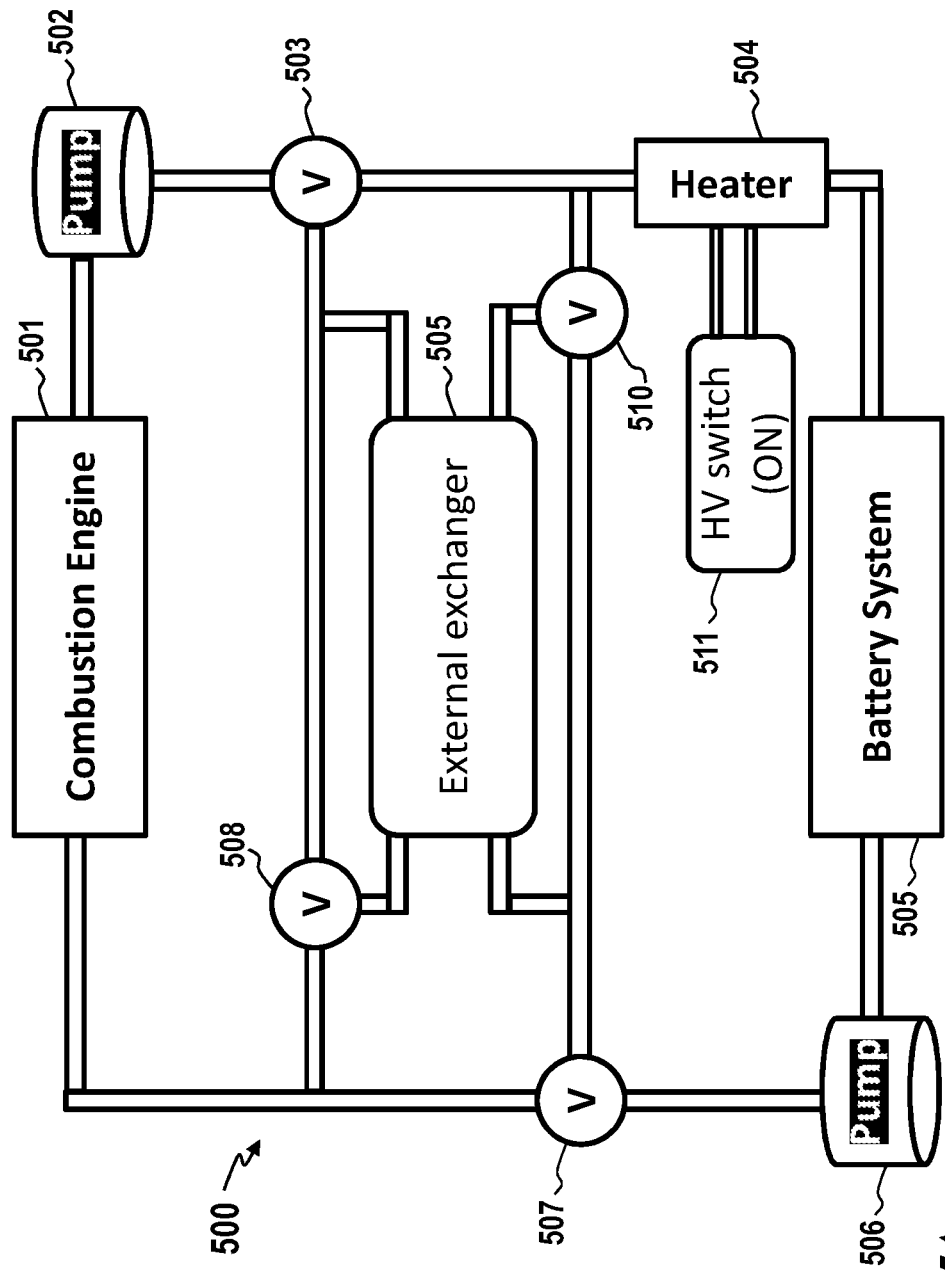
FIGS. 5A-B are simplified diagrams illustrating operation of a thermal management system where the battery system bypasses the heat exchanger and thermal energy is preserved within the system, according to an embodiment set forth herein. The arrows in FIG. 5B illustrate one flow pattern that is possible for this system. Depending on which valves are actuated, other flow patterns are possible.
Figure 5B:
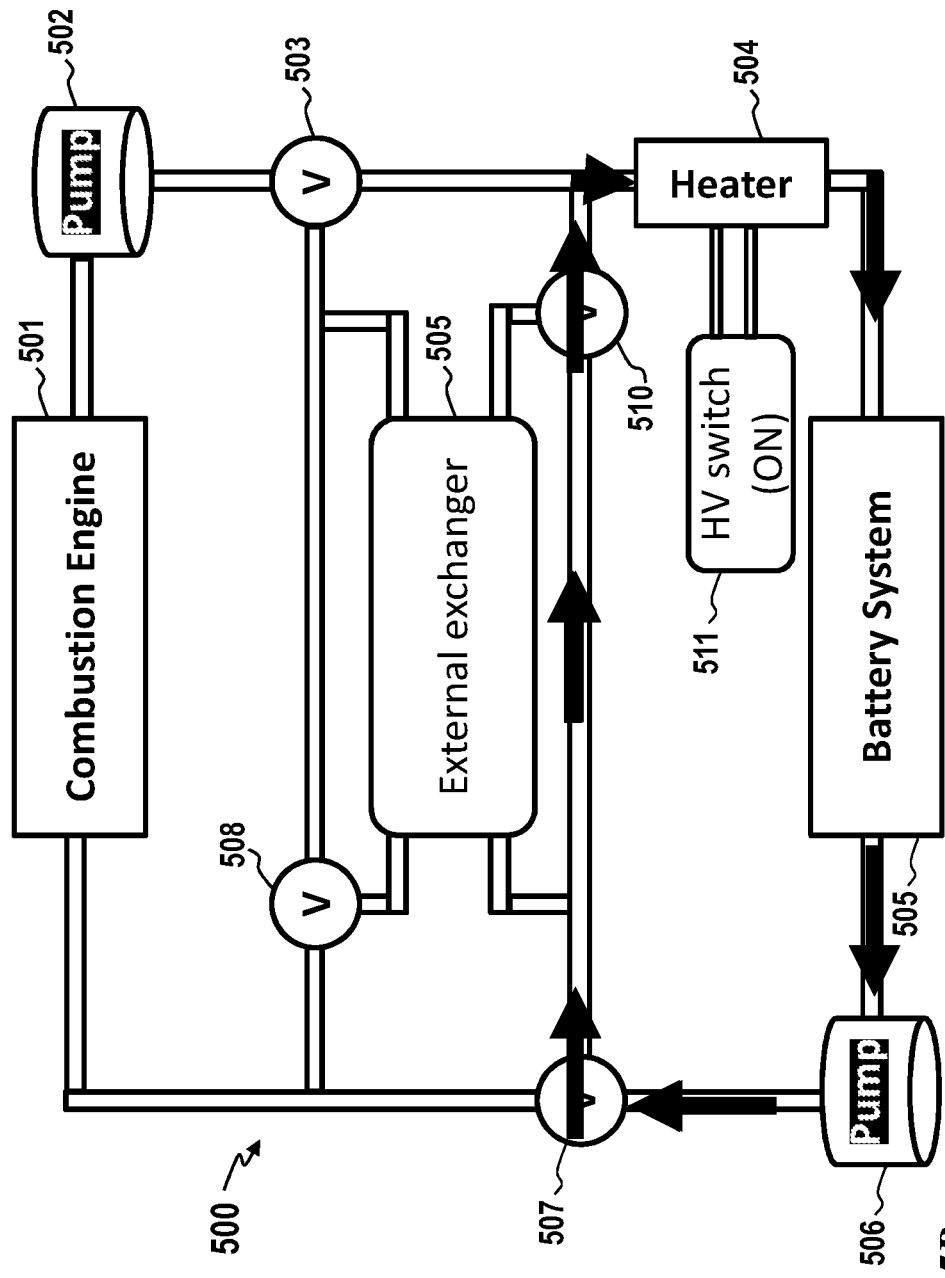

FIG. 5A is a simplified diagram illustrating operation of a thermal management system without using a heat exchanger according to an embodiment set forth herein. As shown in FIG. 5A, the battery module 505 is in a closed loop with the heater 504. For example, the valves 507, 510, 508 and 503 can be configured to, as needed, disengage thermal coupling between the battery system 505 and the combustion engine 501. As an example, in this use case heater is turned on, and battery system can be heated using the heater, without any thermal energy being lost to the combustion engine or to the external heat exchanger. In some examples, circulating heat transfer fluid through the battery system via pump 506 as shown in FIG. 5A, with the heater turned off, equalizes the temperatures of individual cells within the battery system, improving performance and prolonging life of cells in the battery system. It is to be appreciated that other modes of operation are possible as well with the system 500. FIG. 5B illustrates one possible flow pattern, for example.

Figure 6A:
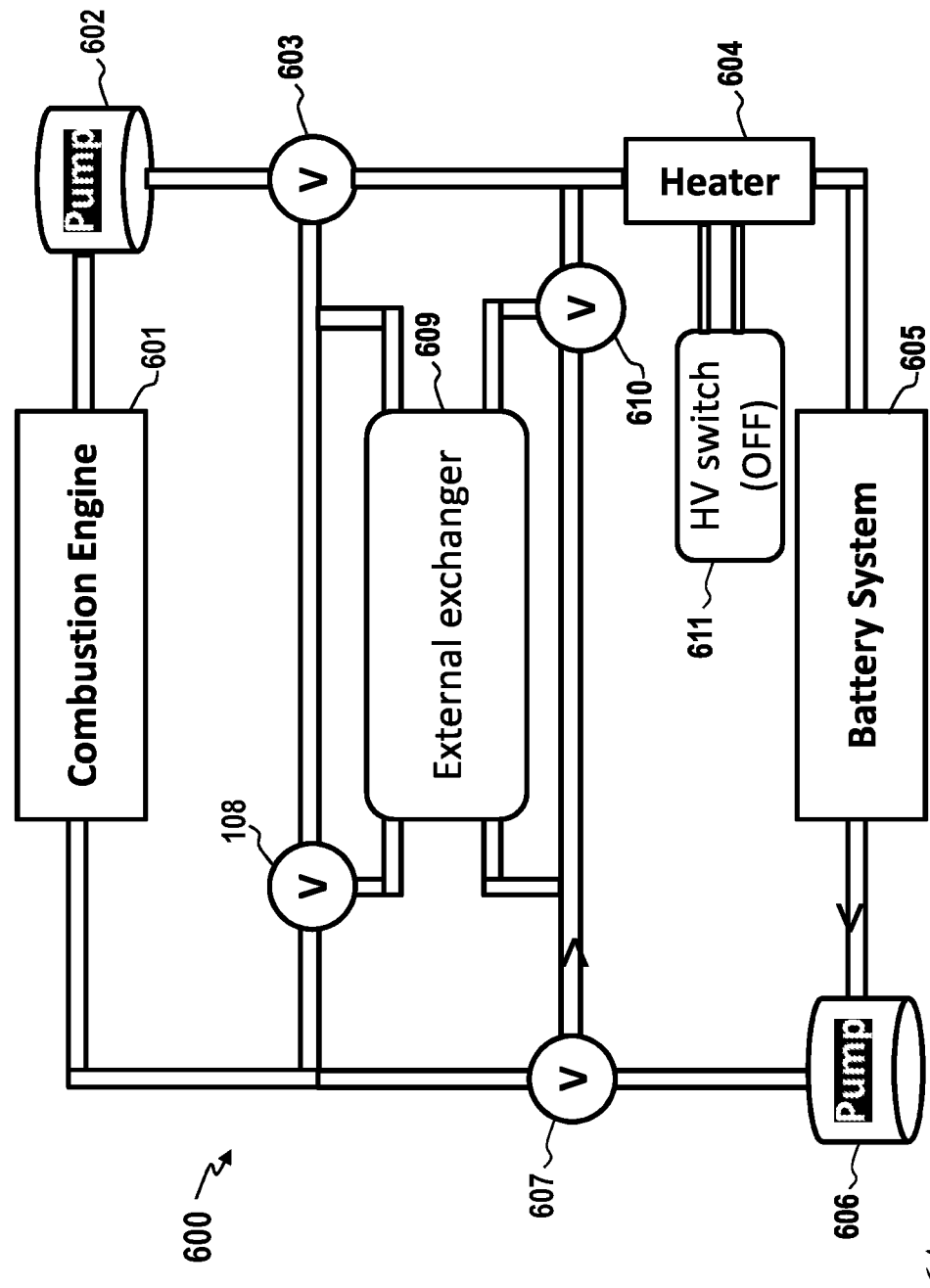
FIGS. 6A-B are simplified diagrams illustrating operation of a thermal management system where battery system heat is rejected via external exchanger according to an embodiment set forth herein. The arrows in FIG. 6B illustrate one flow pattern that is possible for this system. Depending on which valves are actuated, other flow patterns are possible.
Figure 6B:
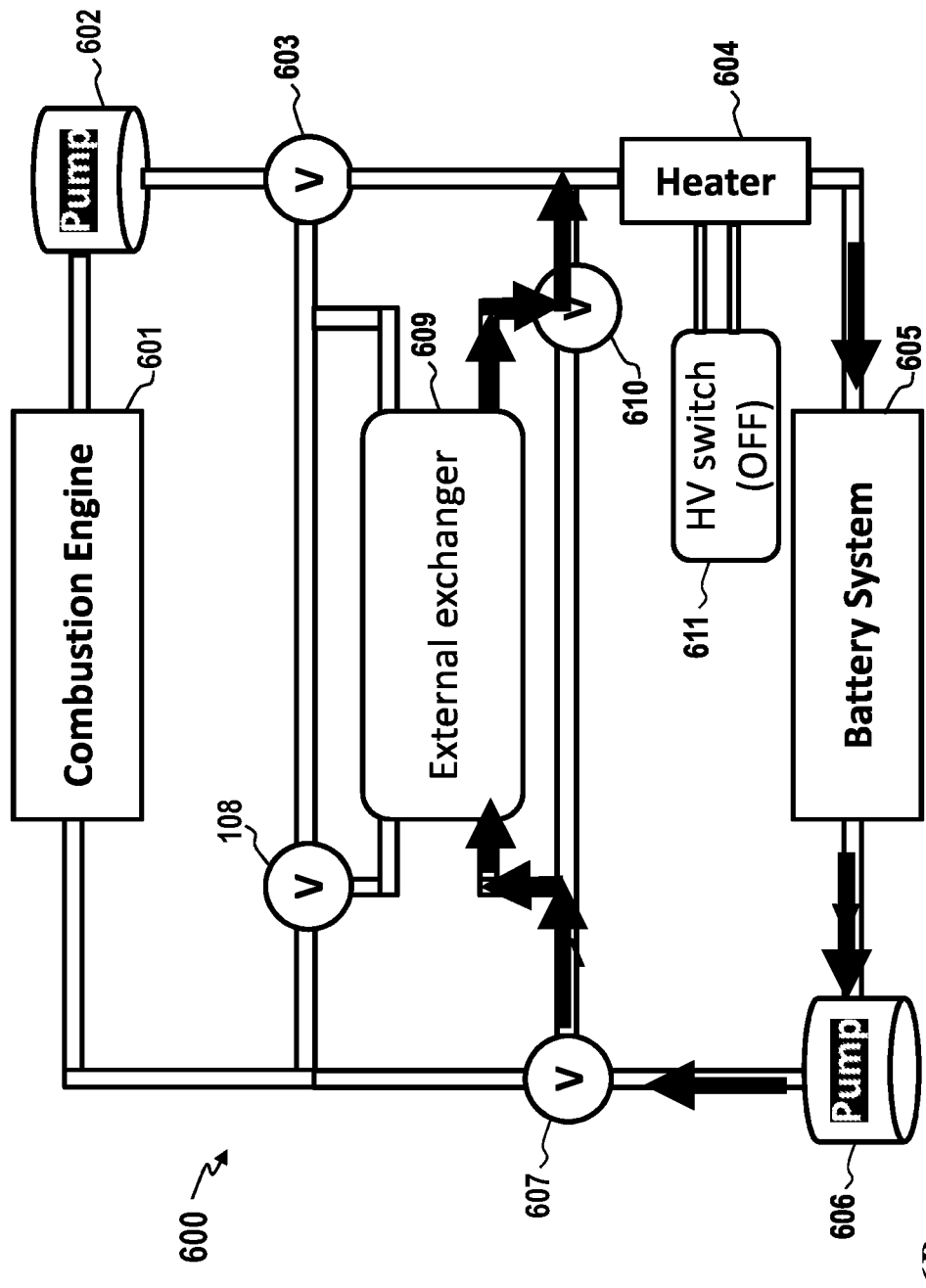

FIG. 6A is a simplified diagram illustrating operation of a thermal management system where battery module heat is rejected via external exchanger according to an embodiment set forth herein. As shown in FIG. 6A, the battery module 605 is thermally coupled to the external exchanger 609. The external exchanger 609 and the battery module 605 are thermally isolated from the combustion engine 601. It is to be appreciated that other modes of operation are possible as well with the system 600. FIG. 6B illustrates one possible flow pattern, for example.

Figure 7A:
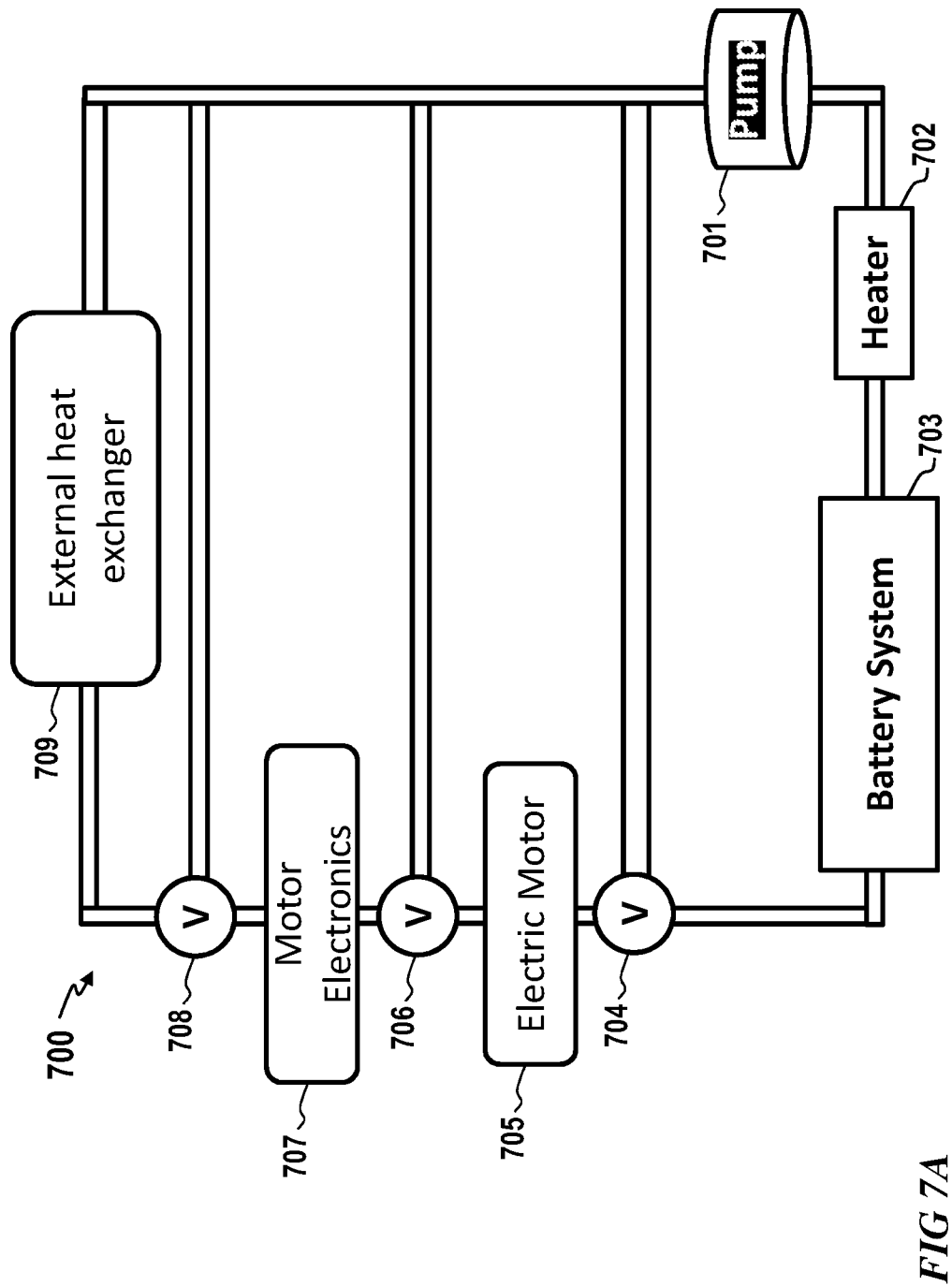
FIGS. 7A-B are simplified diagrams illustrating operation of a thermal management system in an electric vehicle according to an embodiment set forth herein. The arrows in FIG. 7B illustrate one flow pattern that is possible for this system. Depending on which valves are actuated, other flow patterns are possible.
Figure 7B:
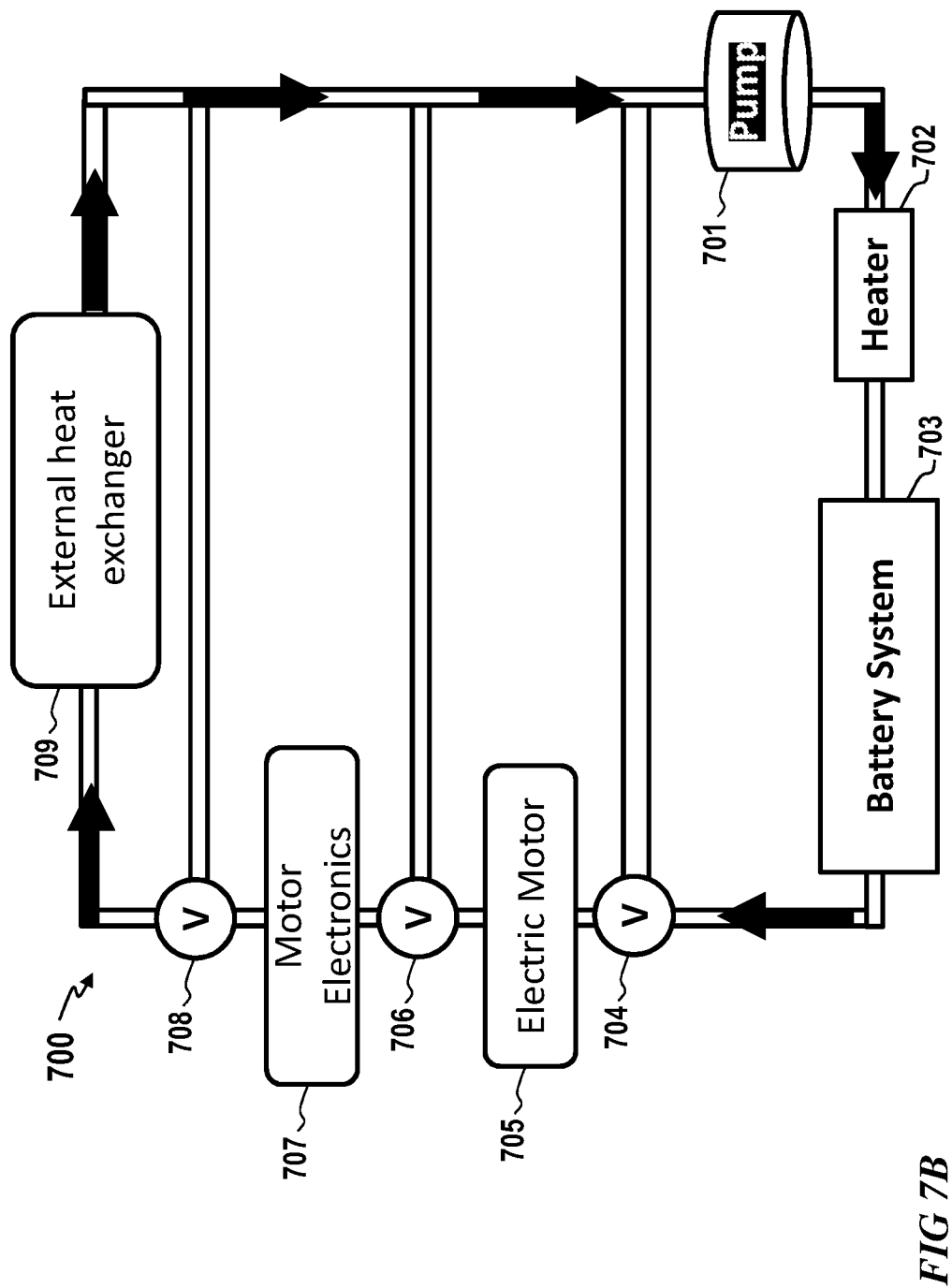

FIG. 7A is a simplified diagram illustrating operation of a thermal management system in an electric vehicle according to an embodiment set forth herein. It is to be appreciated that, as shown in FIG. 7A, the battery system, electric motor (optionally), motor electronics (optionally), and/or other component/s are part of a single thermal circuit and could be operated with only a single pump. For example, heat from all components sharing the thermal circuit can be rejected via a single external heat exchanger. There are benefits stemming from such a simplified thermal system enabled by a single thermal circuit for multiple components: utilizing only a single pump, single heat exchanger and a single thermal circuit reduces the number of components in the vehicle, reducing cost, complexity, and volume used in the vehicle. FIG. 7B illustrates one possible flow pattern, for example.

Figure 8B:
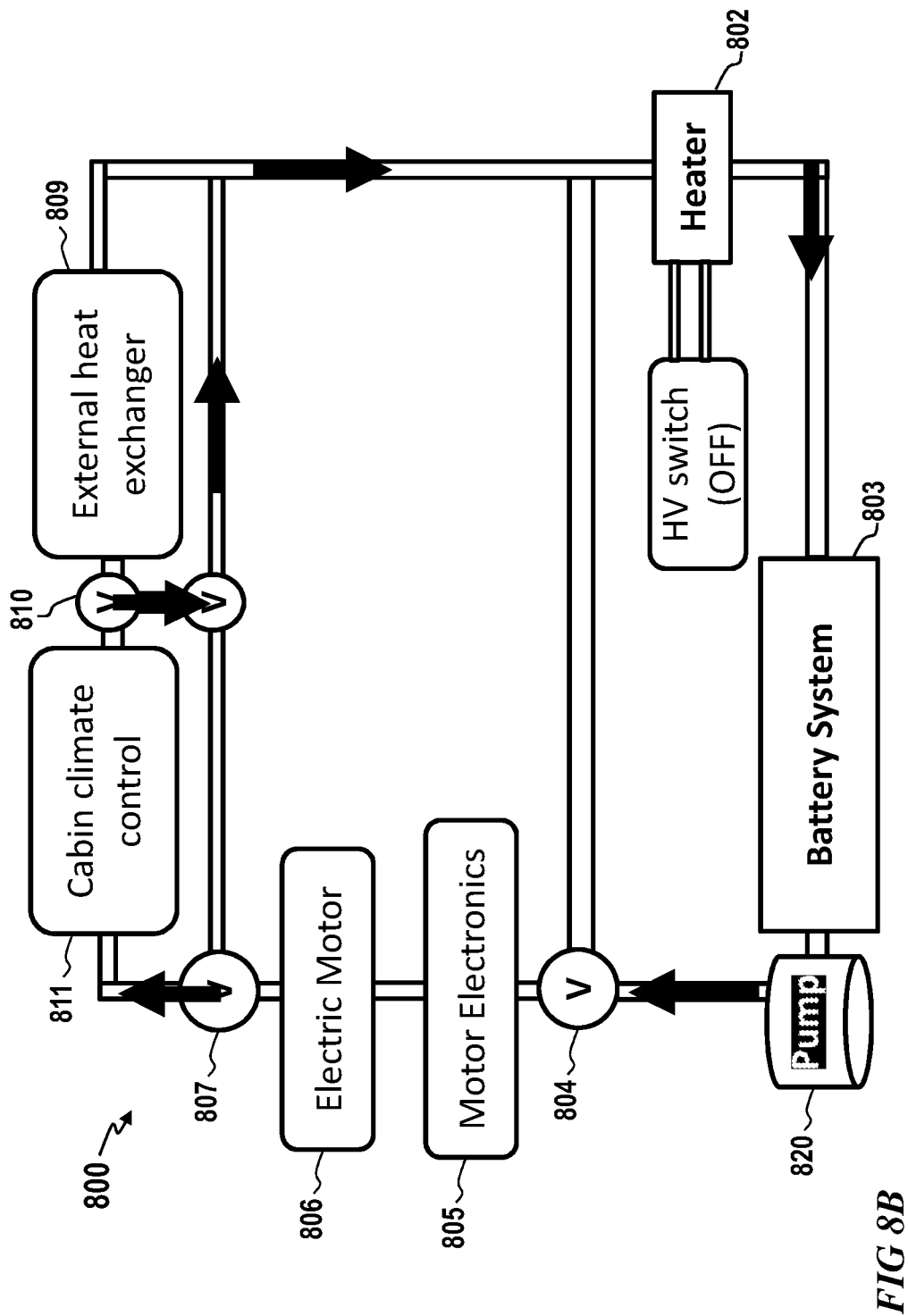

FIG. 8A is a simplified diagram illustrating operation of a thermal management system with a shared thermal circuit having a climate control module according to an embodiment set forth herein. In the thermal management system shown in FIG. 8A, thermal energy from any heat-generating devices, including the battery module, electric motor and motor electronics, is collected in a single thermal circuit that includes a thermal connection to cabin climate control. An advantage of such an arrangement is that heat is collected from all possible sources, maximizing the temperature of the heat transfer fluid when it enters cabin climate control module 811. This allows fast warm-up of the powertrain components in cold soak conditions and heat transfer to the cabin, improving overall vehicle efficiency. Such a system configuration could be controlled as desired to bypass any devices at a lower temperature in order to collect heat from devices at a temperature above a threshold temperature, in order not to lose heat energy to devices unnecessarily. FIG. 8B illustrates one possible flow pattern, for example.

Figure 9A:
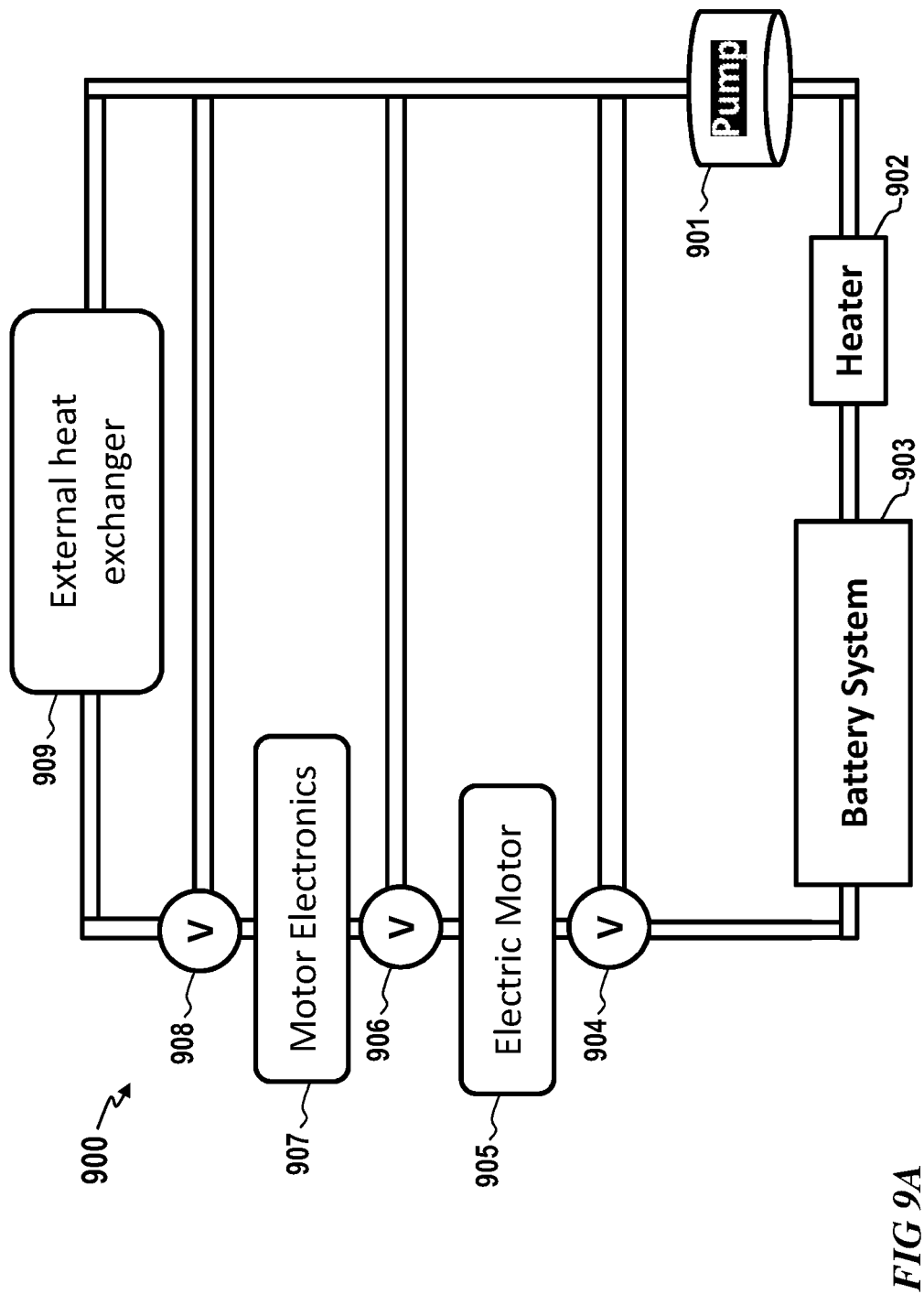
FIGS. 9A-B are simplified diagrams illustrating thermal management system while disengaged from the heat exchanger module according to an embodiment set forth herein. The arrows in FIG. 9B illustrate one flow pattern that is possible for this system. Depending on which valves are actuated, other flow patterns are possible.
Figure 9B:
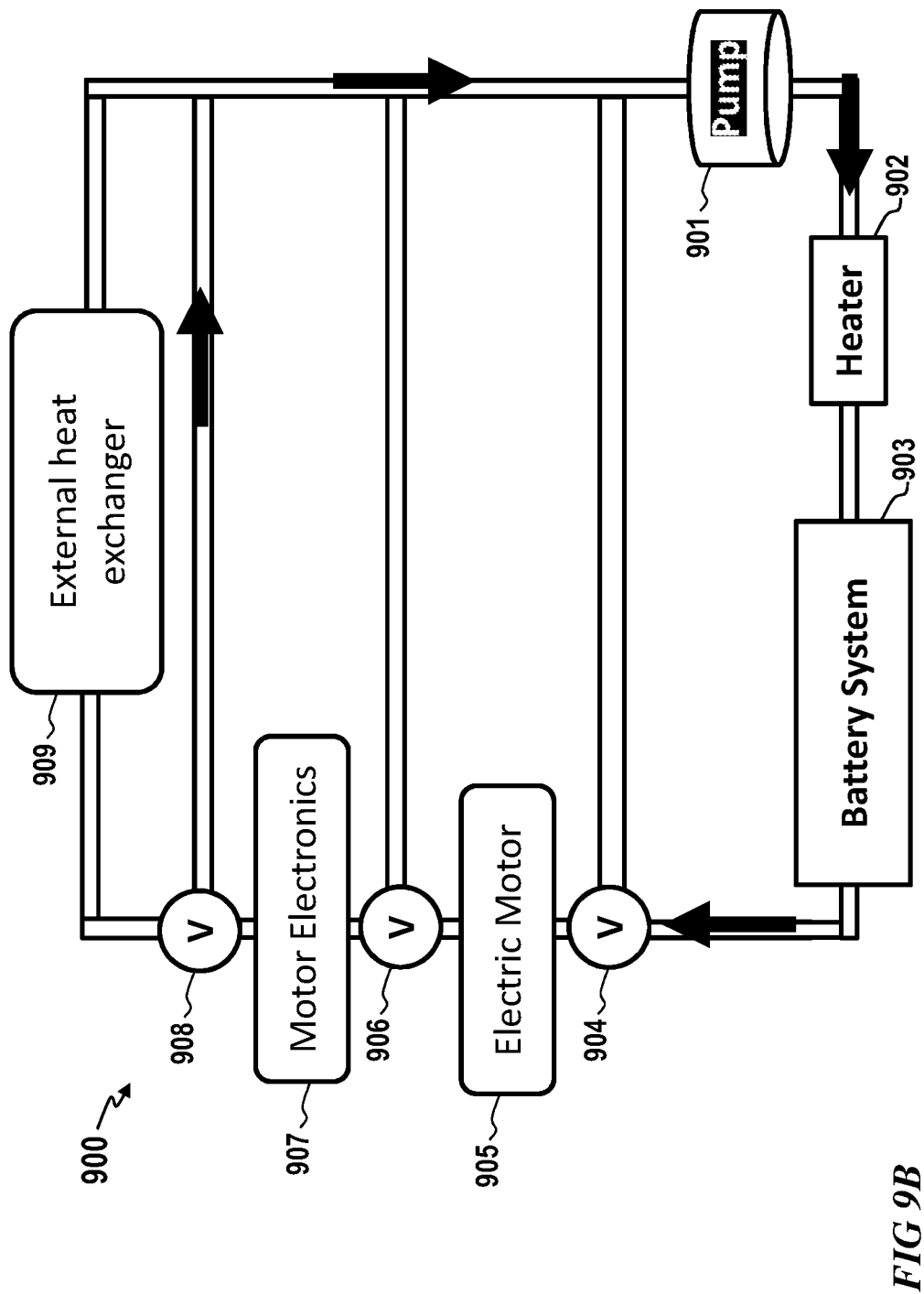

FIG. 9A is a simplified diagram illustrating thermal management system operating in a bypass mode from the heat exchanger module according to an embodiment set forth herein. As shown in FIG. 9A, when the heat transfer fluid flow bypasses the external heat exchanger 909, the thermal management system has the advantage that heat from all the components in the circuit, such as the electric motor 905, motor electronics 907 and other heat-releasing components can be used to warm up the battery system 903. Alternatively, heat from the battery system 903 could warm up the motor electronics 907 and/or electric motor 905. Another benefit of such an arrangement is that temperature is naturally equalized between all the devices in the thermal circuit. FIG. 9B illustrates one possible flow pattern, for example.

Figure 10B:
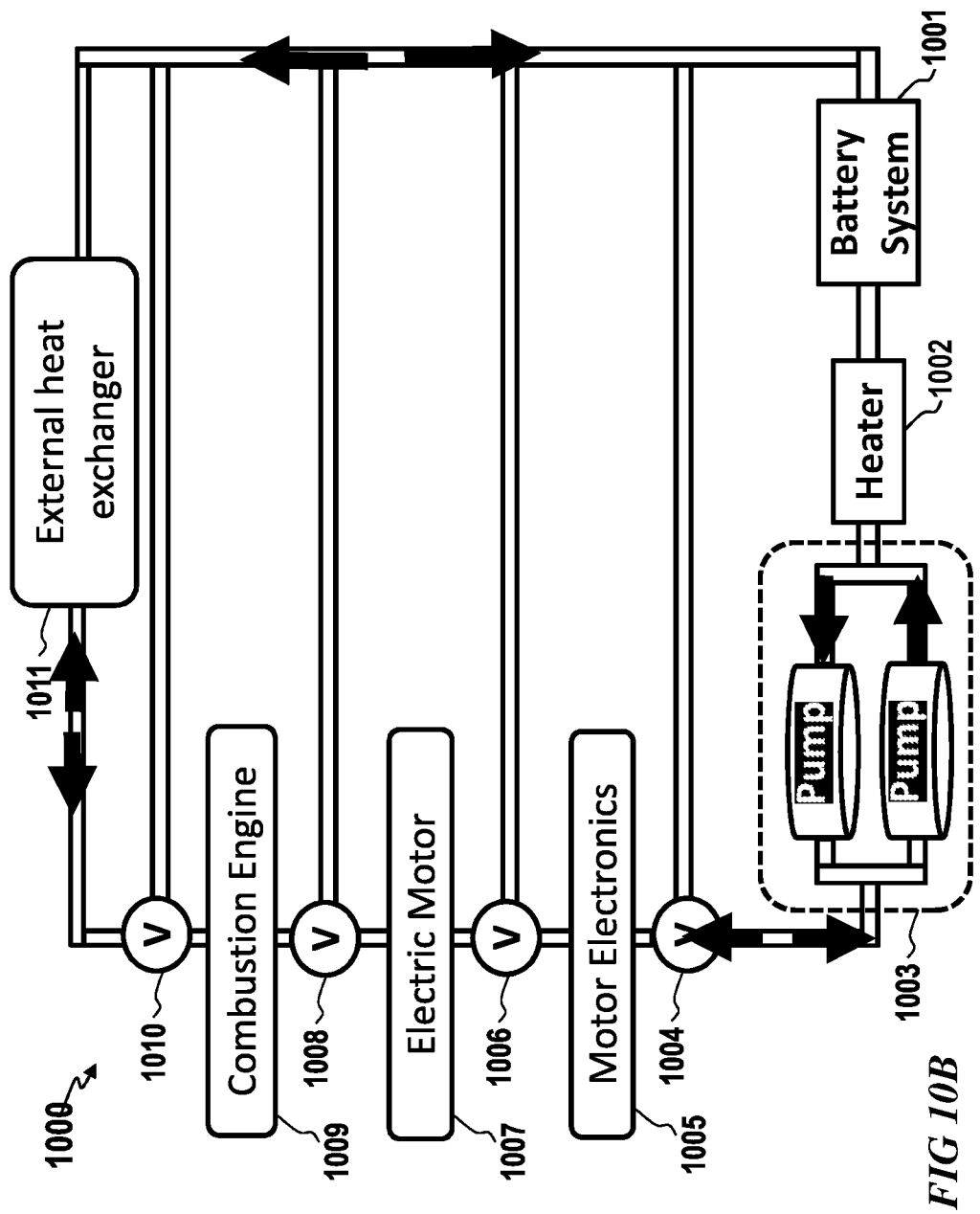

FIG. 10A is a simplified diagram illustrating operation of a thermal management system with bidirectional flow control according to an embodiment set forth herein. As shown in FIG. 10A, the thermal management system, in some examples, has a plurality of pumps arranged such that the flow of the heat transfer fluid is bidirectional, or a single pumping device capable of pumping in both directions. Depending on the implementation, the embodiment can have several advantages over uni-directional pumping: heat can be transferred from battery system to the motor (and/or other components in the circuit) if the battery system is at an elevated temperature or from the motor (or other components in the circuit) to the battery system, if desired. Another benefit of bi-directional flow includes improved thermal management of battery system. Battery cells typically suffer premature degradation because heat is rejected preferentially from a single side of the battery system, due to flow from a single direction. The ability to reverse the flow allows for even cooling of each side of the battery system, prolonging life of the battery system. It is to be appreciated that in a thermal system circuit with a single external heat exchanger and without additional heat-accepting devices, the thermal fluid typically has the lowest temperature immediately after flowing through the heat exchanger. Another benefit of the bi-directional operation is that either of the devices thermally adjacent to the heat exchanger can be selectively cooled with the lowest temperature heat transfer fluid, maximizing the effectiveness of the cooling system. FIG. 10B illustrates possible flow patterns, for example.

Figure 11A:
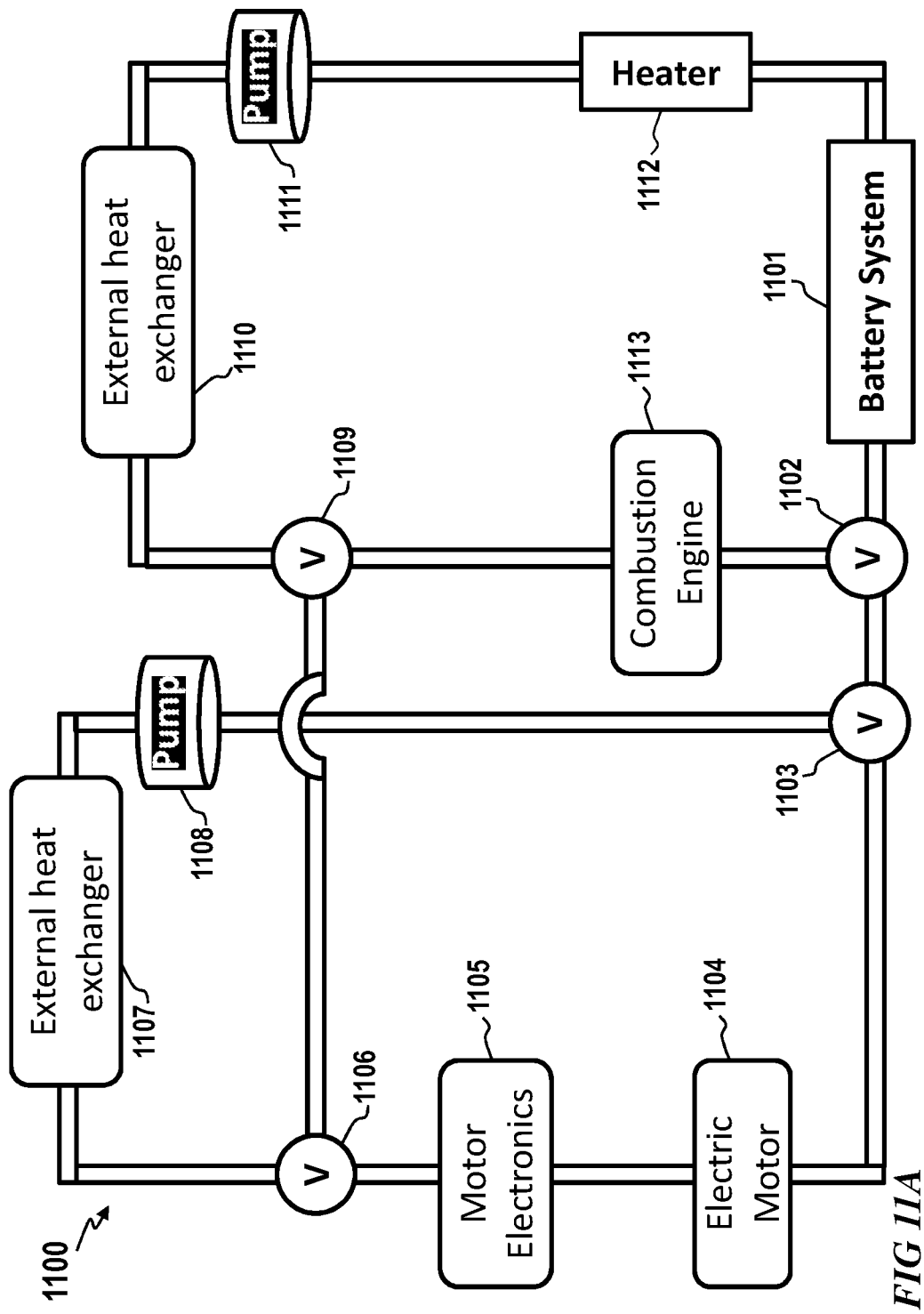
FIGS. 11A-D are simplified diagrams illustrating operation of a thermal management system where the thermal loop that includes several powertrain components can be thermally separated into a first thermal path for first group of powertrain components, according to embodiments set forth herein.
Figure 11B:
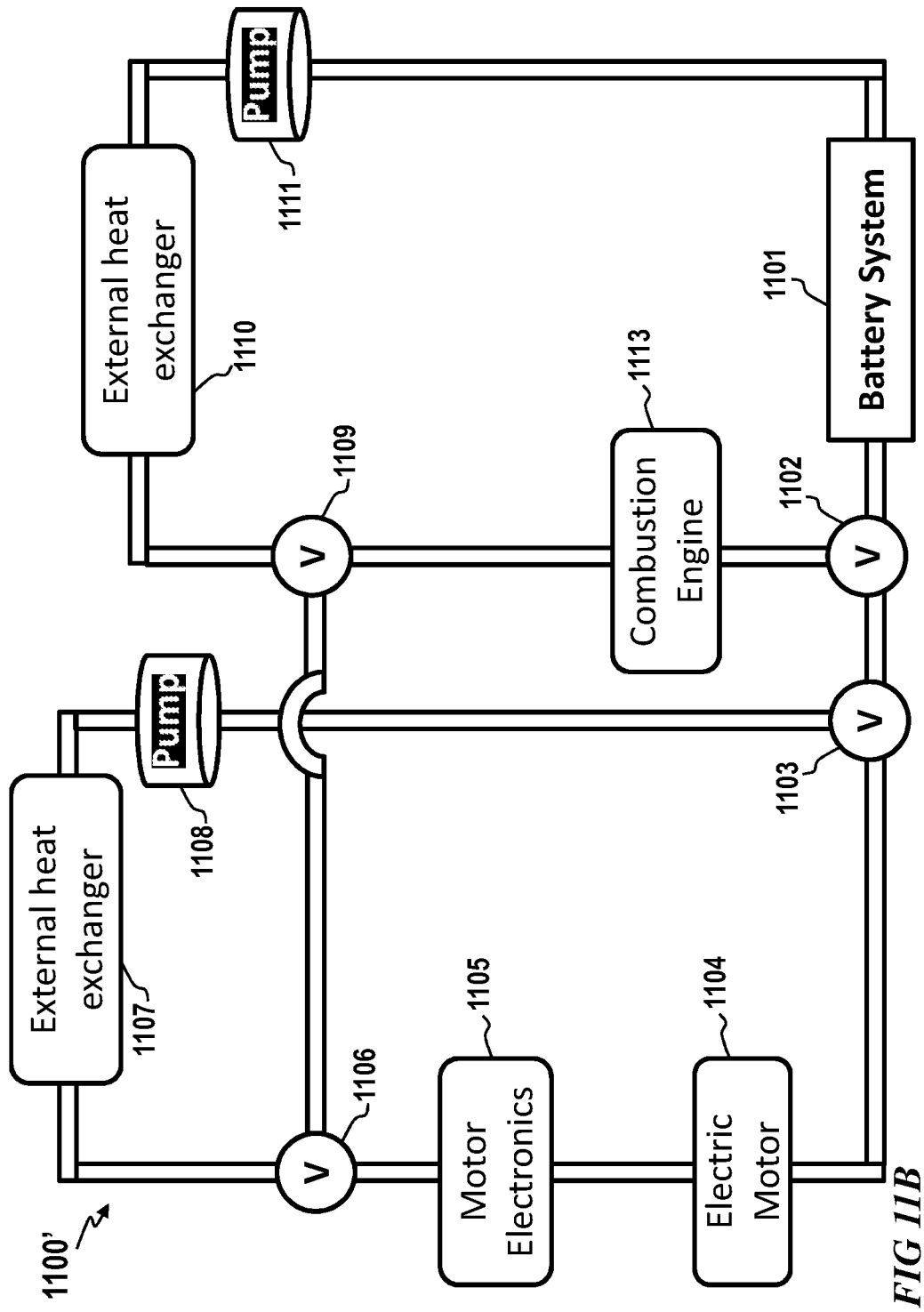
Figure 11C:
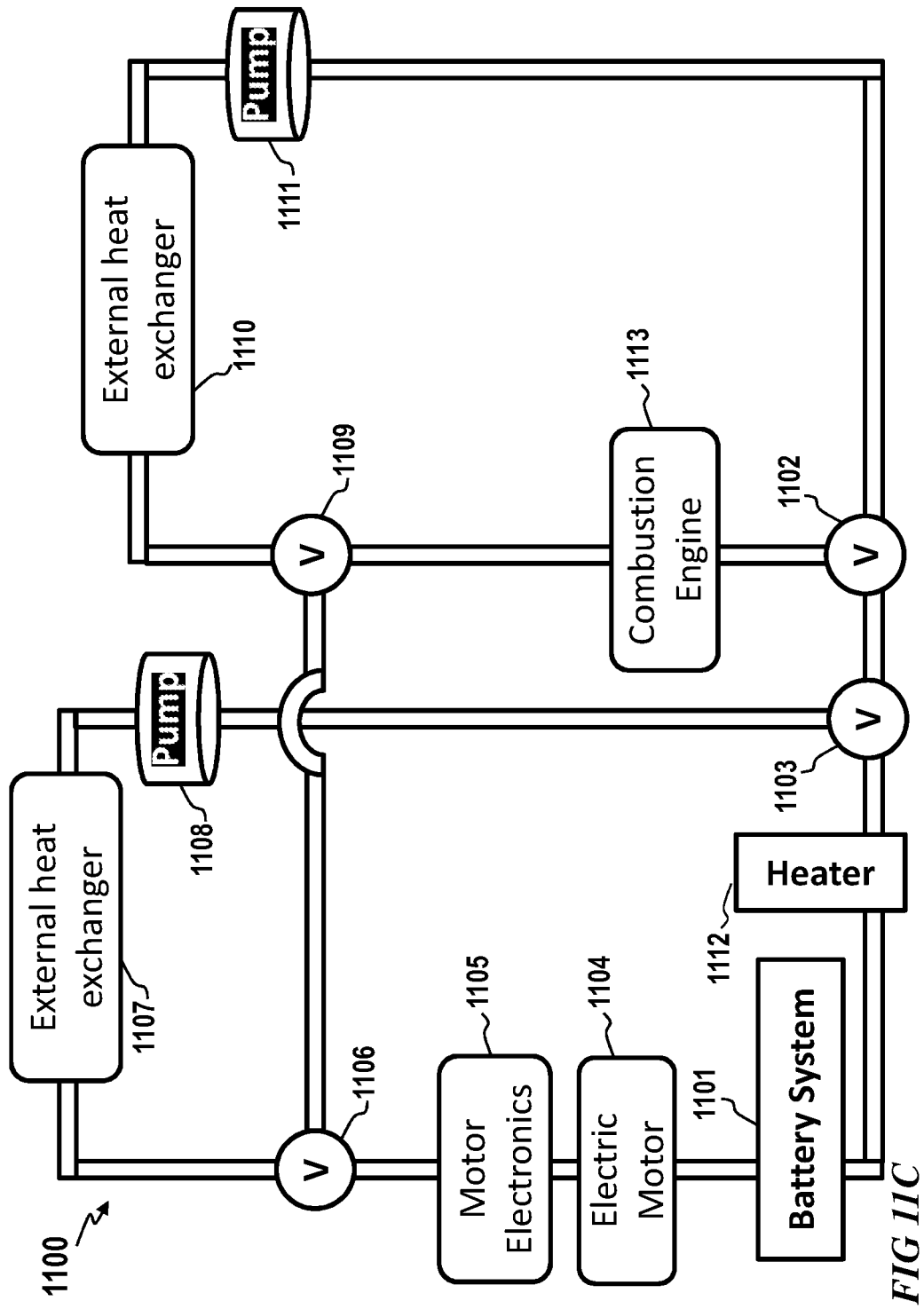
Figure 11D:
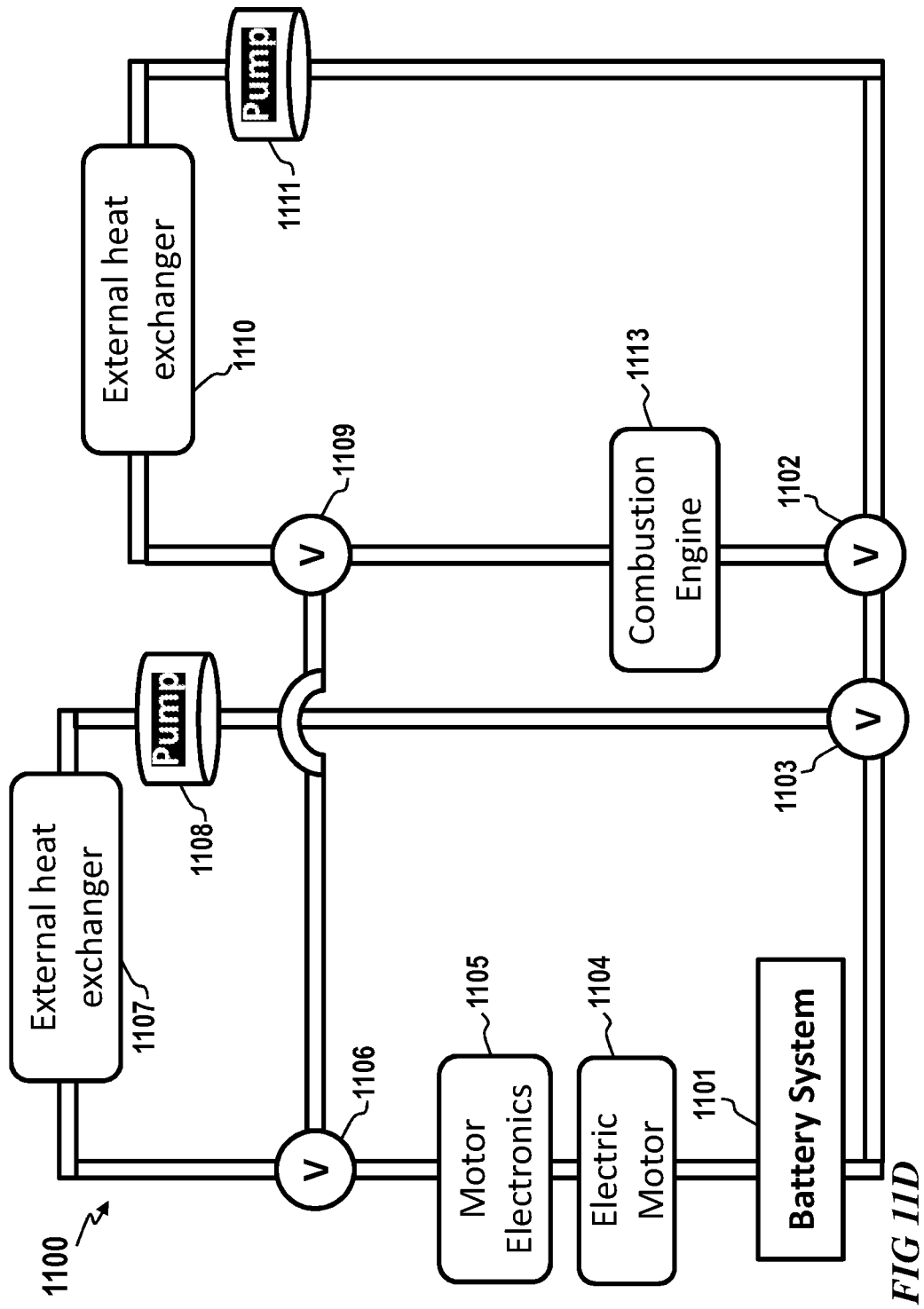

FIG. 11A is a simplified diagram illustrating a thermal management system where one group of powertrain components can be thermally separated from a second group of components according to an embodiment set forth herein. In some examples, that components shown in FIG. 11A have different operating temperature ranges. In certain examples, electric motor and motor electronics may operate at temperature ranges lower than ICE and/or battery system. In some examples, components operating at a relatively low temperature range are thermally coupled to one another in a "low-temperature" thermal loop, and the components operating at relatively high temperature range are thermally to one another in a "high-temperature" thermal loop. In some examples, a control system determines whether to merge operation back into a single thermal circuit. FIG. 11C shows an alternate component arrangement, as an example. In FIG. 11A, the thermal management system includes of a thermal circuit which can be thermally separated into a first thermal path for first group of powertrain components (i.e. battery system 1101 and internal combustion engine 1113) and second thermal path for second group of powertrain components (i.e. electric motor 1104 and inverter 1105) according to an embodiment set forth herein. The thermal separation may be achieved by control of valves such as 1102, 1103, 1106 and 1109. FIGS. 11B and 11D show options without a heater. These arrangements have the advantage that most or all of the powertrain components can be thermally managed with a single thermal circuit, but can also be thermally separated in conditions where different thermal properties (i.e. temperature) are needed for different components. One potential beneficial use case is that when combustion engine is off, all the powertrain components are cooled with a single loop. If the combustion engine is turned on, and the temperature of the thermal fluid in the circuit rises above a predetermined threshold, components that require a lower operating temperature can be thermally disconnected from the loop.

In some examples, set forth herein is a thermal management system for a vehicle with an electric drivetrain. In these examples, the system includes a battery system having at least one battery cell. In some examples, the battery cell has, in some examples, a cycle life of at least 100 cycles. In certain examples, the battery cell has an optimal operating temperature of about 40° C. or higher. In certain examples, the battery cell has an optimal operating temperature of about 45° C. or higher. In certain examples, the battery cell has an optimal operating temperature of about 50° C. or higher. In certain examples, the battery cell has an optimal operating temperature of about 55° C. or higher. In certain examples, the battery cell has an optimal operating temperature of about 60° C. or higher. In certain examples, the battery cell has an optimal operating temperature of about 65° C. or higher. In certain examples, the battery cell has an optimal operating temperature of about 70° C. or higher. In certain examples, the battery cell has an optimal operating temperature of about 75° C. or higher. In certain examples, the battery cell has an optimal operating temperature of about 80° C. or higher. In certain examples, the battery cell has an optimal operating temperature of about 90° C. or higher. In certain examples, the battery cell has an optimal operating temperature of about 100° C. or higher. In certain examples, the battery cell has an optimal operating temperature of about 105° C. or higher. In certain examples, the battery cell has an optimal operating temperature of about 110° C. or higher. In certain examples, the battery cell has an optimal operating temperature of about 115° C. or higher. In certain examples, the battery cell has an optimal operating temperature of about 120° C. or higher. In certain examples, the battery cell has an optimal operating temperature of about 125° C. or higher.

In some of the above examples, the system also includes an internal combustion engine (ICE).

In some of the above examples, the system also includes a shared thermal circuit thermally coupling the battery system and the ICE, including a working fluid, at least one switch or valve for controlling the transfer of the working fluid, and at least one external heat exchanger.

In some of the above examples, the system also includes a control system for controlling the heat exchange between the ICE and the battery system, wherein the control system actuates the at least one switch or valve.

As illustrated in FIG. 1A, in some examples, the system includes a battery system 105 in serial connection with a pump 106 and a heater 104. In some of these examples, the battery system can be warmed by the heater. In some of these examples, the battery can power the heater. In some other examples, an ICE can power the heater which can warm the battery system 105. In some examples, a heat exchanger can be serially connected to the battery, depending on the valves actuated (e.g., 107 and 110) in order to exchange heat from the battery system 105 or from the ICE 101. Depending on the valves which are actuated (e.g., 107, 108, 103, and 110), the working fluid can be circulated between the ICE 101 and the battery system 105 or optionally also to the external exchanger.

As illustrated in FIG. 1B, in some examples, the system does not include heater 104 but does include the aforementioned components.

Figure 3C:
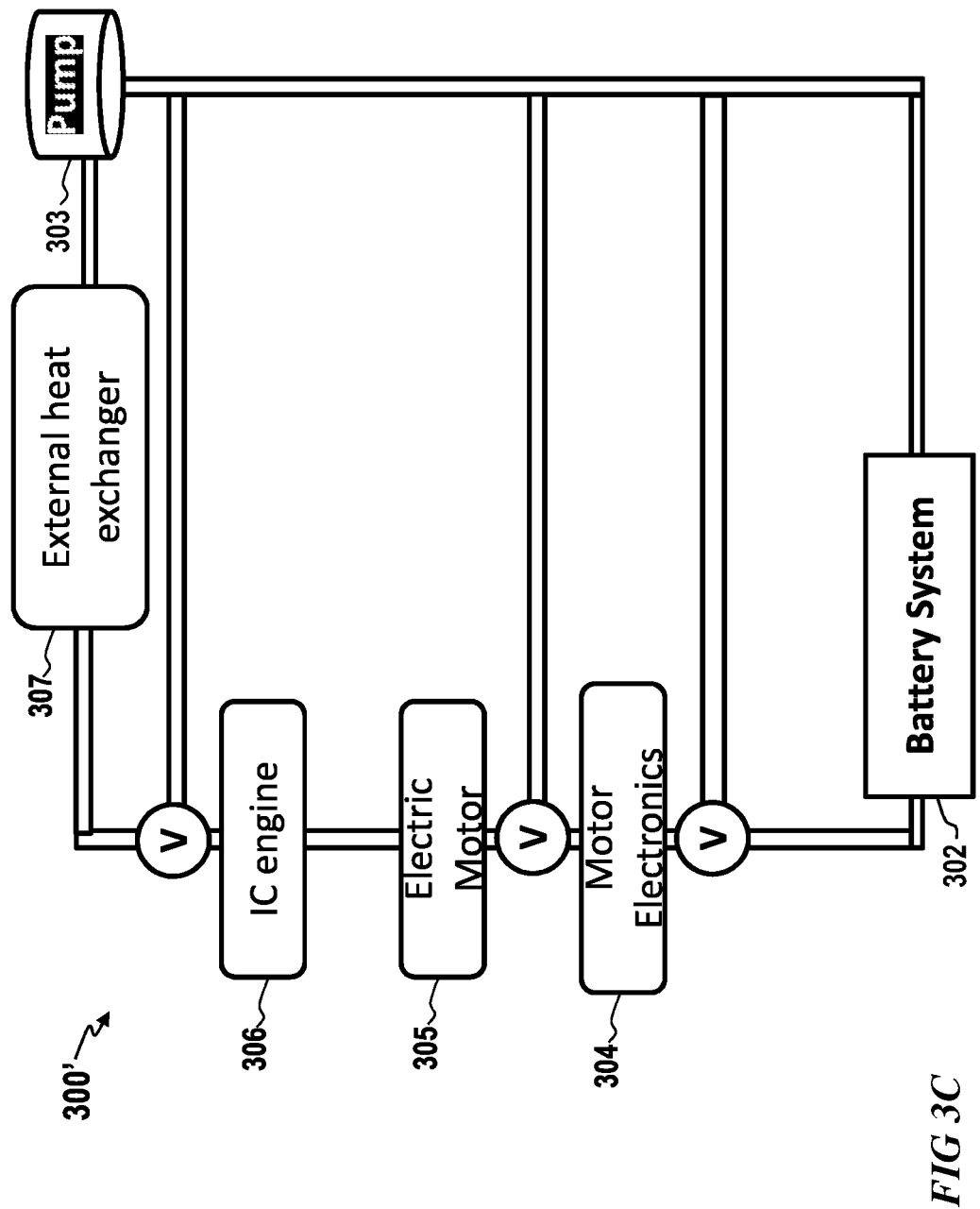

As illustrated in FIG. 3A, 3B, or 3C, in some examples, the ICE 306, electric motor 305, and motor electronics 304 can be serially connected within the thermal circuit. In some examples, the working fluid that contacts the battery system can be transferred to or from the ICE 306, electric motor 305, and motor electronics 304 depending on the valves (V) which are activated and depending on the operation of pump 303.

As illustrated in FIG. 4B, in some examples, the working fluid can be transferred from the battery system 405 to the ICE 401 without contacting the external exchanger 411. In some other examples, valves 409 and 410 can be actuated to also allow the working fluid to contact the external exchanger.

As illustrated in FIG. 5B, in some examples, the working fluid can be circulated around the battery system 505 but without contacting the external exchanger 505 or the ICE 501, depending on the operation of pump 506 and valves 507 and 510.

As illustrated in FIG. 6B, in some of the above examples, the working fluid can also be circulated through the external exchanger 609 depending on the actuation of valve 610.

As illustrated in FIG. 8B, in some of the thermal management systems described here, such as the system of FIG. 8A, the working fluid can also be circulated through the battery system 803, motor electronics 805, electric motor 806, cabin climate control 811 but not through the external exchanger 809.

As illustrated in FIG. 9B, in some of the thermal management systems described here, such as the system of FIG. 9A, the working fluid can be circulated through the battery system 903, motor electronics 907, electric motor 905, cabin climate control 811 but not through the external exchanger 909.

As illustrated in FIG. 10B, in some of the thermal management systems described here, such as the system of FIG. 10A, the working fluid can also be circulated in a bi-directional flow pattern through a battery system 1001, at least one or more pumps, motor electronics 1005, electric motor 1007, combustion engine 1009, and external exchanger 1011.

As illustrated in FIG. 11A, in some examples, the thermal management systems includes a battery system 1101 on a thermal loop that also includes an ICE 1113 and which is separate from a thermal loop that includes the motor electronics 1105 and electric motor 1104. Depending on the actuation of valves 1103, 1102, 1109, or 1106, these components can be thermally isolated or thermally coupled with each other. As illustrated in FIG. 11B, in some examples, the heater is not included in the thermal management system. As illustrated in FIG. 11C, in some examples, the thermal management systems includes a battery system 1101 on a thermal loop that also includes the motor electronics 1105 and electric motor 1104 and which is separate from a thermal loop that includes an ICE 1113. Depending on the actuation of valves 1103, 1102, 1109, or 1106, these components can be thermally isolated or thermally coupled with each other. As illustrated in FIG. 11D, in some examples, the heater is not included in the thermal management system.

EXAMPLES

Conventional Plug-In Hybrid Electric Vehicle (PHEV) Example

In one example, a PHEV with an 85 hp (63 kW) internal combustion engine, 120 kW electric motor, and a 16 kWh battery system was used. The internal combustion engine and battery system were each on separate thermal management loops each including a pump and radiator. 30 kW of drive power was employed, in which the internal combustion engine had a 33% rejection rate of heat into the coolant loop (i.e. 10 kW at 30 kW drive power). The battery system thermal management loop also featured a 5 kW heater.

The 16 kWh battery system featured lithium ion cells that have a gravimetric energy density of 200 Wh/kg and a total cell weight of 80 kg. Cell specific heat capacity was 1 KJ/kg ° C. Cell & module heat capacity was 106 KJ/° C.

The pump for this independent battery thermal management loop weighed 1 kg, took up 1.5 L of space, and cost $100. The radiator for the independent battery thermal management loop weighed 0.5 kg, took up 3.5 L of space, and cost $75. The heater for the battery thermal management loop weighed 7 kg, took up 10 L of space, and cost $100.

A −10° C. cold soak was used for the battery system and the internal combustion engine operated the car until the battery system was at 90% of cell power capability. The 5 kW heater warmed the battery modules to −20° C. in approximately 10 minutes, enabling 90% of the cells peak power rating. Heating in the above example off the electric heater alone consumed 3000 kJ or 0.8 kWh of system energy.

TABLE 1

| Typical Li-ion Cells | Heating Time | | | | | | |
|---|---|---|---|---|---|---|---|
| | 1 second | 10 seconds | 30 seconds | 1 minute | 2 minutes | 5 minutes | 10 minutes |
| Heater Energy Output (kJ) | 5 | 50 | 150 | 300 | 600 | 1500 | 3000 |
| Cell Temperature Increase (° C.) | 0.05 | 0.47 | 1.41 | 2.82 | 5.64 | 14.10 | 28.20 |
| Battery System Temperature (° C.) | −10.0 | −9.5 | −8.6 | −7.2 | −4.4 | 4.1 | 18.2 |
| Approximate Battery System Rate Capability (% of Peak) | 18% | 18% | 18% | 20% | 25% | 45% | 90% |
| Battery System Power Capability (kW) | 21.6 | 21.6 | 21.6 | 24 | 30 | 54 | 108 |

Shared Thermal Management PHEV Example

In a second example, a PHEV with an 85 hp (63 kW) internal combustion engine, 120 kW electric motor, and a 16 kWh battery system was used. The internal combustion engine and battery system were on a shared thermal management loop as described in this disclosure.

The 16 kWh battery system featured lithium ion cells that have a gravimetric energy density of 200 Wh/kg and a total cell weight of 80 kg. Cell specific heat capacity was 1 KJ/kg ° C. Cell & module heat capacity was 106 KJ/° C.

With this implementation of the shared thermal management system compared to the conventional example, no independent pump or radiator was required for the battery system. Furthermore, no heater was required. Consequently, this saves an aggregate 8.5 kg, 15 L of space, and $275 of cost. Expressed per kWh of battery system, this cost savings was about $17/kWh.

A −10° C. cold soak was used for the battery system with the internal combustion engine operating the car until the battery system was at 90% of cell power capability, the 10 kW of "waste heat" from the internal combustion engine was transferred via the shared thermal management loop to warm the battery modules to −20° C. in approximately 5 minutes, enabling 90% of the cells peak power rating. Relative to the "conventional PHEV" example above, the warm time to 90% of cell power capability was achieved in half the time (i.e. 5 minutes faster) and without the expenditure of 0.8 kWh of battery system capacity (5% of system capacity) which at 250 Wh/mile represents 3.3 miles of electric range.

TABLE 2

| Typical Li-ion Cells | Heating Time | | | | | |
| --- | --- | --- | --- | --- | --- | --- |
| | 1 second | 10 seconds | 30 seconds | 1 minute | 2 minutes | 5 minutes |
| Cumulative ICE Heat Rejected into Coolant (kJ) | 10 | 100 | 300 | 600 | 1200 | 3000 |
| Cell Temperature Increase (° C.) | 0.09 | 0.94 | 2.82 | 5.64 | 11.28 | 28.20 |
| Battery System Temperature (° C.) | −9.9 | −9.1 | −7.2 | −4.4 | 1.3 | 18.2 |
| Approximate Battery System Rate Capability (% of Peak) | 18% | 18% | 18% | 25% | 40% | 90% |
| Battery System Power Capability (kW) | 21.6 | 21.6 | 21.6 | 30 | 48 | 108 |

The above description is presented to enable one of ordinary skill in the art to make use of disclosures herein and to incorporate them in the context of particular applications. Various modifications, as well as a variety of uses in different applications will be readily apparent to those skilled in the art, and the general principles defined herein may be applied to a wide range of embodiments. Thus, the disclosure set forth herein is not intended to be limited to the embodiments presented, but is to be accorded the widest scope consistent with the principles and novel features disclosed herein.

It is to be appreciated that embodiments set forth herein provide numerous advantages over existing technologies. Examples of improvements include but are not limited to reduced component costs, lower weight, lower volume, higher reliability, longer life, higher performance, higher efficiency, and a reduction in complexity. There are other benefits as well.

What is claimed is:

1. A thermal management system for a vehicle, the system comprising:
    a control system;
    a shared thermal circuit comprising a fluid transfer module and one or more switches, the one or more switches being configured to operate based on signals received from the control system;
    a powertrain component thermally coupled to the shared thermal circuit;
    an external heat exchanger module comprising one or more heat rejection devices configured to dissipate heat in an operation mode; and
    a battery module having a cycle life of at least 100 cycles and being capable of operating at a temperature between about 40° C. and 150° C., the battery module being thermally coupled to the thermal circuit,
    wherein the control system is configured to cause the heat dissipated by the powertrain component to transfer to the battery module when the battery module is lower than a predetermined temperature, and
    wherein the vehicle does not comprise an internal combustion engine.

2. The system of claim 1, wherein the powertrain component comprises an electric motor.

3. The system of claim 1, wherein the one or more heat rejection devices are configured to dissipate heat away from the thermal management system.

4. The system of claim 1, wherein the shared thermal circuit comprises one or more pumping devices for transferring the working fluid in a first direction or a second direction within the circuit.

5. The system of claim 1, wherein the predetermined temperature is 75° C.

6. The system of claim 1, wherein the battery module is a 16 kWh battery module.

7. The system of claim 1, wherein the battery module further comprises a solid-state battery.

8. The system of claim 1, wherein the battery module further comprises a battery comprising a solid-state electrolyte.

9. The system of claim 1, wherein the battery module further comprises a battery comprising a lithium-stuffed garnet electrolyte.

10. The system of claim 1, wherein the vehicle comprises an electric vehicle.

11. A thermal management system for a vehicle, the system comprising:
  a control system;
  a shared thermal circuit comprising a fluid transfer module and one or more switches, the one or more switches being configured to operate based on signals received from the control system;
  a powertrain component thermally coupled to the shared thermal circuit;
  an external heat exchanger module comprising one or more heat rejection devices configured to dissipate heat in an operation mode; and
  a battery module having a cycle life of at least 100 cycles and being capable of operating at a temperature between about 40° C. and 150° C., the battery module being thermally coupled to the thermal circuit,
  wherein the control system is configured to cause the heat dissipated by the powertrain component to transfer to the battery module when the battery module is lower than a predetermined temperature, and
  wherein the vehicle comprises an electric vehicle.

12. The system of claim 11, wherein the one or more heat rejection devices are configured to dissipate heat away from the thermal management system.

13. The system of claim 11, wherein the shared thermal circuit comprises one or more pumping devices for transferring the working fluid in a first direction or a second direction within the circuit.

14. The system of claim 11, wherein the predetermined temperature is 75° C.

15. The system of claim 11, wherein the battery module is a 16 kWh battery module.

16. The system of claim 11, wherein the battery module further comprises a solid-state battery.

17. The system of claim 11, wherein the battery module further comprises a battery comprising a solid-state electrolyte.

18. The system of claim 11, wherein the battery module further comprises a battery comprising a lithium-stuffed garnet electrolyte.

* * * * *